US009240024B2

(12) United States Patent
Suzuki

(10) Patent No.: US 9,240,024 B2
(45) Date of Patent: Jan. 19, 2016

(54) COMMENT SUBMISSION SUPPORT SYSTEM, COMMENT SUBMISSION SUPPORT DEVICE, COMMENT SUBMISSION SUPPORT DEVICE CONTROL METHOD, PROGRAM, AND INFORMATION STORAGE MEDIUM

(75) Inventor: Suguru Suzuki, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 0 days.

(21) Appl. No.: 13/817,089

(22) PCT Filed: Oct. 18, 2011

(86) PCT No.: PCT/JP2011/073906
§ 371 (c)(1),
(2), (4) Date: Feb. 14, 2013

(87) PCT Pub. No.: WO2012/053504
PCT Pub. Date: Apr. 26, 2012

(65) Prior Publication Data
US 2013/0144766 A1 Jun. 6, 2013

(30) Foreign Application Priority Data

Oct. 22, 2010 (JP) .................................. 2010-238027

(51) Int. Cl.
*G06Q 30/06* (2012.01)
*G06Q 30/02* (2012.01)

(52) U.S. Cl.
CPC ........ *G06Q 30/0641* (2013.01); *G06Q 30/0206* (2013.01); *G06Q 30/0278* (2013.01);
(Continued)

(58) Field of Classification Search
CPC ........................................... G06Q 30/00–30/08
USPC ............................................... 705/26.1–27.2
See application file for complete search history.

(56) References Cited

U.S. PATENT DOCUMENTS

2003/0033212 A1* 2/2003 Sandhu et al. .................. 705/26
2006/0253394 A1* 11/2006 Mao ................................ 705/40
(Continued)

FOREIGN PATENT DOCUMENTS

JP 2002-007903 A 1/2002
JP 2002-318927 A 10/2002
(Continued)

OTHER PUBLICATIONS

"Upgrading paging and moving to the Web". Rhodes, Wayne L, Jr. AS/400 Systems Management; Jul. 1998;26, 7. p. 36. Retrieved via ProQuest on Sep. 1, 2015.*

(Continued)

*Primary Examiner* — Michael Misiaszek
(74) *Attorney, Agent, or Firm* — Sughrue Mion, PLLC

(57) ABSTRACT

To provide a comment submission support system capable of supporting submission of such a comment as to enable a person who has viewed the comment to grasp a purchase status of a product or service. A purchase status information acquisition unit (61) acquires purchase status information relating to a purchase status of a product or service that is sold by a sales method in which a unit price of the product or service purchased by a plurality of purchasers within a target period is determined based on a total number of purchases of the product or service purchased by the plurality of purchasers within the target period. A transmission unit (63) transmits link information for access to a communication service device and information based on the purchase status information to a terminal of a user. The link information and the information based on the purchase status information are used by the terminal of the user to request the communication service device for submission screen data being such data as to automatically input the comment relating to the purchase status of the product or service to a comment input field.

13 Claims, 16 Drawing Sheets

(52) U.S. Cl.
CPC ............ *G06Q30/06* (2013.01); *G06Q 30/0605* (2013.01); *G06Q 30/0609* (2013.01); *G06Q 30/0631* (2013.01); *G06F 2213/0038* (2013.01)

(56) References Cited

U.S. PATENT DOCUMENTS

2011/0213650 A1* 9/2011 Mesaros .................... 705/14.23
2011/0276484 A1* 11/2011 Pearson et al. ................ 705/44
2012/0036423 A1* 2/2012 Haynes et al. ............... 715/230

FOREIGN PATENT DOCUMENTS

| JP | 2003-132236 A | 5/2003 |
| JP | 2006-018755 A | 1/2006 |
| JP | 2007-115047 A | 5/2007 |
| JP | 2010-044452 A | 2/2010 |

OTHER PUBLICATIONS

Written Opinion dated Dec. 13, 2011, issued in International Application No. PCT/JP2011/073906.

International Search Report (PCT/ISA/210) dated Dec. 13, 2011, issued in International Application No. PCT/JP2011/073906.

* cited by examiner

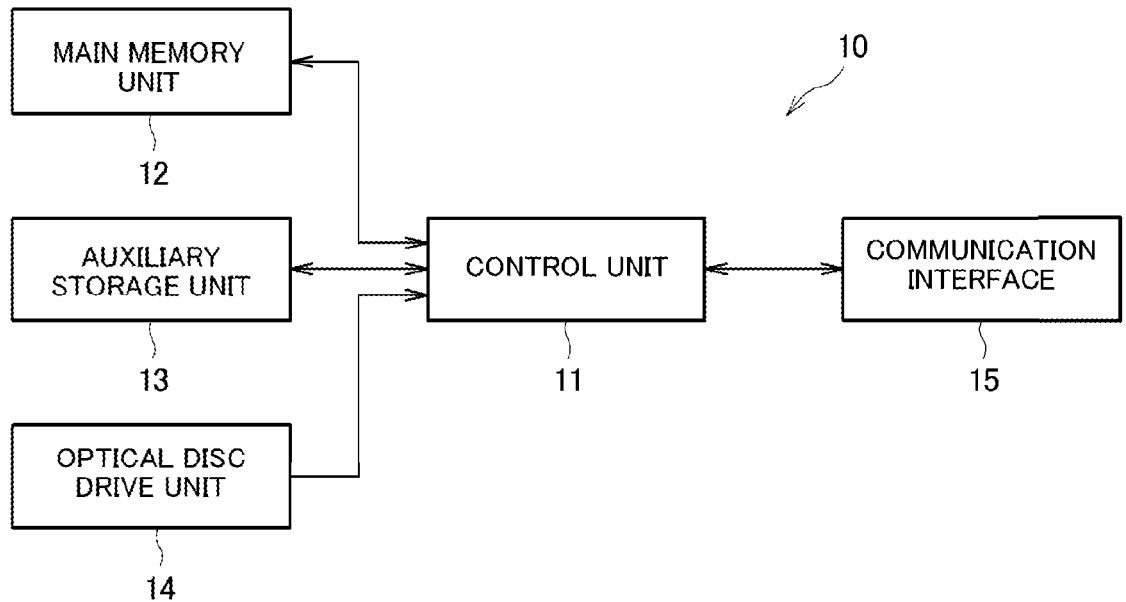
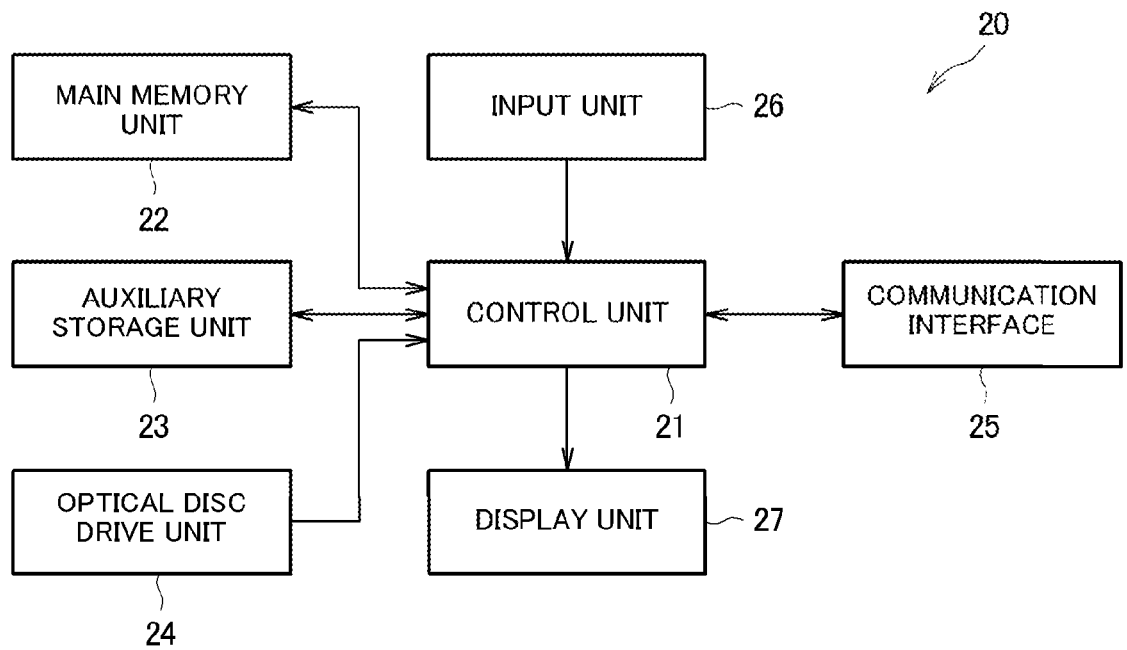

| USER ID | FULL NAME | ADDRESS | E-MAIL ADDRESS | CREDIT CARD INFORMATION |
|---|---|---|---|---|
| U0001 | TARO YAMADA | ---- | ---- | ---- |
| U0002 | HANAKO TANAKA | ---- | ---- | ---- |
| ... | ... | ... | ... | ... |

| TRANSACTION ID | USER ID | PRODUCT ID | DATE/TIME OF PURCHASE | NUMBER OF PURCHASES | AMOUNT |
|---|---|---|---|---|---|
| T0001 | U0001 | G0002 | 2010/09/21 12:00 | 1 | 5000 |
| ... | ... | ... | ... | ... | ... |

FIG.10

| PRODUCT ID | SHOP ID | PRODUCT NAME | CATEGORY | IMAGE | URL | DESCRIPTIONS | UNIT PRICE | INVENTORY QUANTITY | JOINT PURCHASE FLAG |
|---|---|---|---|---|---|---|---|---|---|
| G0001 | S0001 | A | — | — | — | — | 1300 | 320 | 1 |
| G0002 | S0010 | B | — | — | — | — | 5000 | 100 | 0 |
| ... | ... | ... | ... | ... | ... | ... | ... | ... | ... |

FIG.11

| PRODUCT ID | SALES PERIOD | UPPER LIMIT NUMBER |
|---|---|---|
| G0001 | 2010/09/21 10:00 ~ 2010/09/23 12:00 | 300 |
| ... | ... | ... |

FIG.12

| PRODUCT ID | NUMBER OF PURCHASES | UNIT PRICE |
|---|---|---|
| G0001 | $1 \leq n \leq 10$ | 1300 |
| | $11 \leq n \leq 100$ | 1200 |
| | $101 \leq n \leq 200$ | 1100 |
| | $201 \leq n \leq 300$ | 1000 |
| | ... | ... |

FIG.13

| PRODUCT ID | USER ID | DATE/TIME OF PURCHASE | NUMBER OF PURCHASES |
|---|---|---|---|
| G0001 | U0001 | 2010/09/21 10:12 | 3 |
| | ... | ... | ... |
| | U0001 | 2010/09/23 08:09 | 1 |
| | U0120 | 2010/09/23 08:28 | 2 |
| | U0201 | 2010/09/23 08:58 | 1 |
| | ... | ... | ... |

<a href="http://b****.com/home?status= PRODUCT:A [LINE BREAK] THREE MORE ITEMS UNTIL YOU GET DISCOUNT OF 200 YEN! [LINE BREAK] TWO HOURS LEFT BEFORE END DATE/TIME! [LINE BREAK]
http://a****.co.jp/G0001/">
<img src="http://c****.com/icon.gif">
</a>

•
•
•

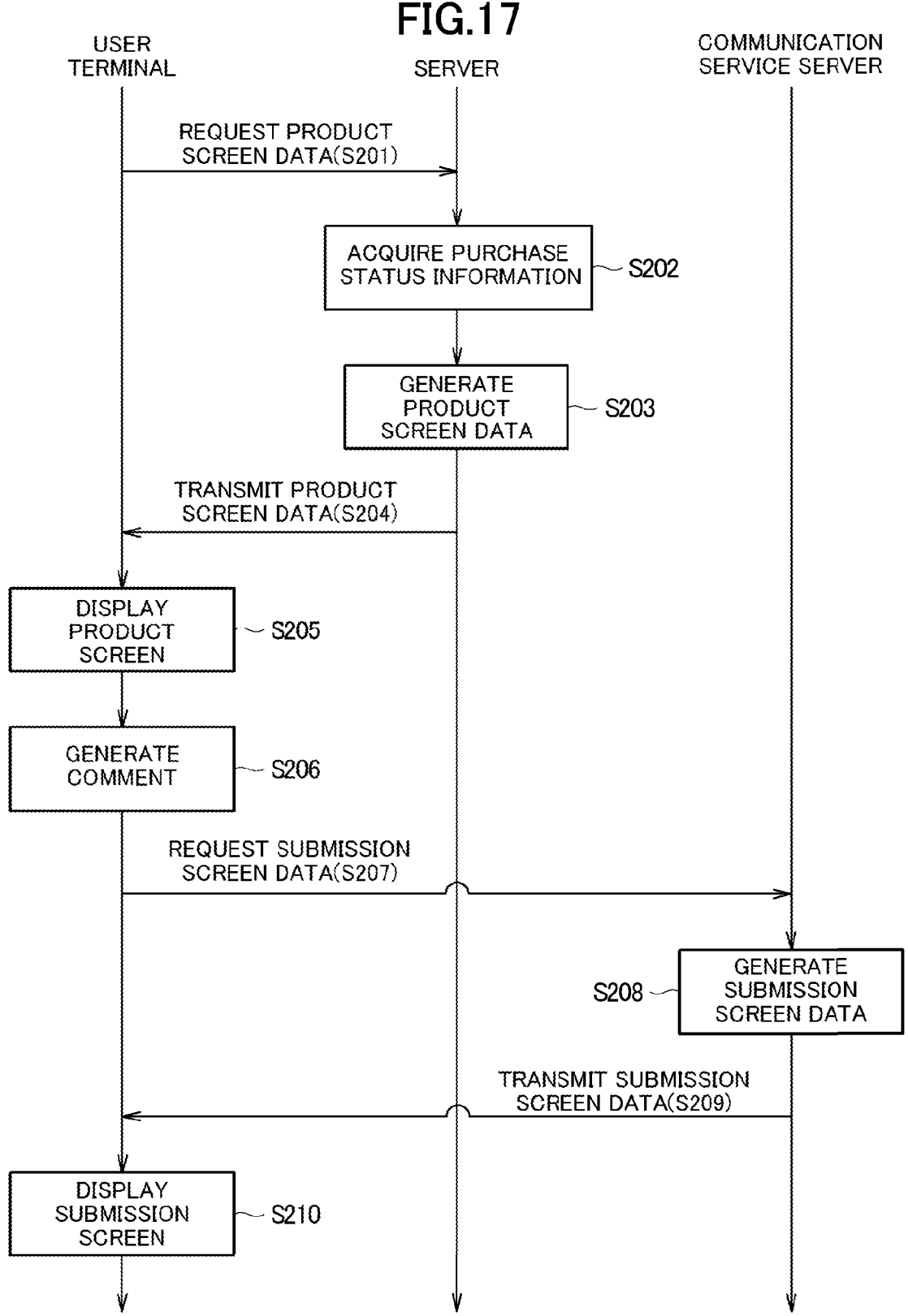

FIG.18

```
         ⋮
<script type="text/javascript">
function make_comment(){
71 {    ------------------------------
        ------------------------------
        ------------------------------
    }
function func(){
72 {    var comment = make_ comment();
        location.href = "http://b****.com/home?status="
                        + comment;
    }
</script>
         ⋮

<form name="f">
    <input type="hidden" name="g_name" value="A">
    <input type="hidden" name="g_number" value="3">
70 {<input type="hidden" name="g_price" value="200">
    <input type="hidden" name="g_time" value="2">
    <input type="hidden" name="g_url" value="http://a****.
    co.jp/G0001/">
73→ <img src="http://c****.com/icon.gif" onclick="func()">
</form>
         ⋮
```

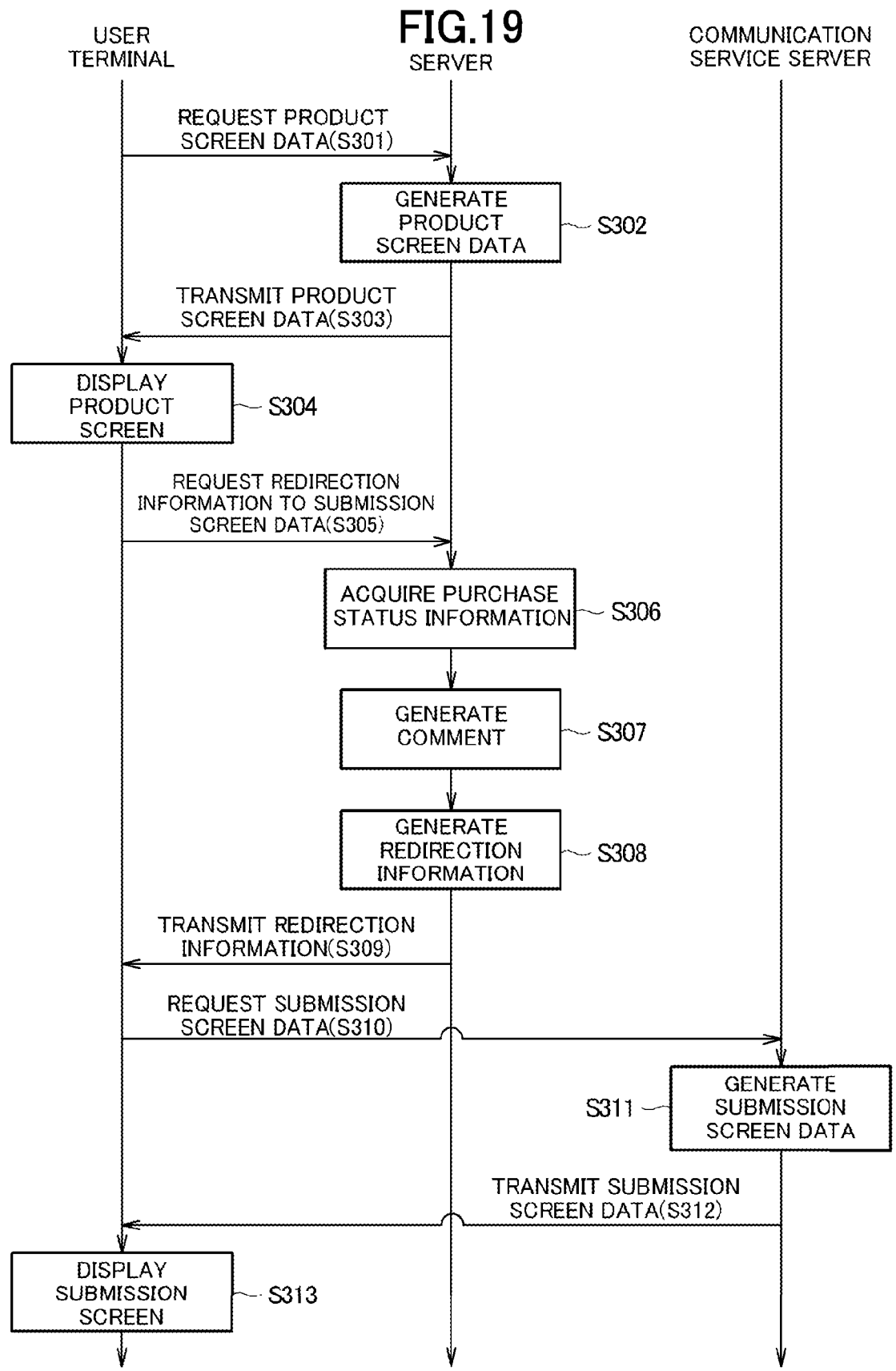

FIG.20

```
                    •
                    •
                    •
<a href="http://a****.co.jp/redirect.cgi?id=G0001">
<img src="http://c****.com/icon.gif">
</a>
                    •
                    •
                    •
```

FIG.21

Location: http://b****.com/home?status= PRODUCT:A [LINE BREAK] THREE MORE ITEMS UNTIL YOU GET DISCOUNT OF 200 YEN! [LINE BREAK] TWO HOURS LEFT BEFORE END DATE/TIME! [LINE BREAK]
http://a****.co.jp/G0001/

COMMENT SUBMISSION SUPPORT SYSTEM, COMMENT SUBMISSION SUPPORT DEVICE, COMMENT SUBMISSION SUPPORT DEVICE CONTROL METHOD, PROGRAM, AND INFORMATION STORAGE MEDIUM

CROSS REFERENCE TO RELATED APPLICATIONS

This application is a National Stage of International Application No. PCT/JP2011/073906 filed Oct. 18, 2011, claiming priority based on Japanese Patent Application No. 2010-238027, filed Oct. 22, 2010, the contents of all of which are incorporated herein by reference in their entirety.

TECHNICAL FIELD

The present invention relates to a comment submission support system, a comment submission support device, a support method for a comment submission device, a program, and an information storage medium.

BACKGROUND ART

There is known an electronic commerce system that enables a user to purchase a product or service through a communication network. In some of such electronic commerce systems, a product or service can be jointly purchased (for example, Patent Literature 1). In a joint purchase (a group buying), a unit price of a product purchased within a target period is determined depending on a number of purchases of the product within the period. As the number of purchases of the product becomes larger (purchasers of the product increases), the unit price of the product becomes lower.

Further, in the electronic commerce system, a link to a communication service such as a Twitter (trademark) service is sometimes provided to a product screen in order to allow the user to submit a comment relating to the product to the communication service. Some of such electronic commerce systems are configured to display a submission screen for submitting the comment when the user clicks on the link and initially display predefined sentences on the submission screen.

CITATION LIST

Patent Literature

Patent Literature 1: JP 2007-115047 A

SUMMARY OF INVENTION

Technical Problem

Such a comment submission function as described above is assumed to be used in a case where a user prompts another user to a joint purchase of a product or service. However, even though a purchase status (for example, price and remaining time that enables the purchase) of the product or service changes in the joint purchase, a conventional electronic commerce system merely displays predefined sentences initially on a submission screen, and hence a person who has viewed such a comment sometimes fails to grasp the purchase status of the product or service. As a result, the above-mentioned comment submission function is sometimes not enough as a function that allows the user to prompt another user to the joint purchase of the product or service.

The present invention has been made in view of the above-mentioned problem, and an object thereof is to provide a comment submission support system, a comment submission support device, a comment submission support method, a program, and an information storage medium, which are capable of supporting submission of such a comment as to enable a person who has viewed the comment to grasp a purchase status of a product or service, for example.

Solution to Problem

In order to solve the above-mentioned problem, a comment submission support system according to the present invention is a comment submission support system including: a comment submission support device for supporting submission of a comment in a communication service for making public the comment submitted by a contributor to another person; and a terminal of a user which is communicably connected to the comment submission support device, in which: the comment submission support system further includes storage means for storing information relating to a purchase status of a product or service that is sold by a sales method in which a unit price of the product or service purchased by a plurality of purchasers within a target period is determined based on a total number of purchases of the product or service purchased by the plurality of purchasers within the target period; the comment submission support device includes: purchase status information acquisition means for acquiring purchase status information relating to the purchase status of the product or service based on storage contents of the storage means; and transmission means for transmitting link information for access to a communication service device for providing the communication service and information based on the purchase status information to the terminal of the user; the terminal of the user includes: requesting means for requesting, based on the link information and the information based on the purchase status information, the communication service device for submission screen data being data for displaying a submission screen for submitting the comment and being such data as to automatically input the comment relating to the purchase status of the product or service to a comment input field of the submission screen; and means for causing a display unit to display the submission screen based on the submission screen data transmitted from the communication service device; and the comment relating to the purchase status of the product or service is automatically input to the comment input field of the submission screen displayed on the display unit.

Further, a comment submission support device according to the present invention is a comment submission support device, which is communicably connected to a terminal of a user, for supporting submission of a comment in a communication service for making public the comment submitted by a contributor to another person, the comment submission support device including: purchase status information acquisition means for acquiring purchase status information relating to a purchase status of a product or service based on storage contents of storage means for storing information relating to the purchase status of the product or service that is sold by a sales method in which a unit price of the product or service purchased by a plurality of purchasers within a target period is determined based on a total number of purchases of the product or service purchased by the plurality of purchasers within the target period; and transmission means for transmitting link information for access to a communication service device for providing the communication service and information based on the purchase status information to the terminal of the user, in which the link information and the information based on the purchase status information are used by the terminal of the user to request the communication service device for submission screen data being data for displaying a submission screen for submitting the comment and being such data as to automatically input the comment relating to the purchase status of the product or service to a comment input field of the submission screen.

Further, a method of controlling a comment submission support device according to the present invention is a method of controlling a comment submission support device for supporting submission of a comment in a communication service for making public the comment submitted by a contributor to another person, the method including: a purchase status information acquisition step of acquiring purchase status information relating to a purchase status of a product or service based on storage contents of storage means for storing information relating to the purchase status of the product or service that is sold by a sales method in which a unit price of the product or service purchased by a plurality of purchasers within a target period is determined based on a total number of purchases of the product or service purchased by the plurality of purchasers within the target period; and a transmission step of transmitting link information for access to a communication service device for providing the communication service and information based on the purchase status information to a terminal of the user, in which the link information and the information based on the purchase status information are used by the terminal of the user to request the communication service device for submission screen data being data for displaying a submission screen for submitting the comment and being such data as to automatically input the comment relating to the purchase status of the product or service to a comment input field of the submission screen.

Further, a program according to the present invention is a program for causing a computer communicably connected to a terminal of a user to function as a comment submission support device for supporting submission of a comment in a communication service for making public the comment submitted by a contributor to another person, the program causing the computer to function as: purchase status information acquisition means for acquiring purchase status information relating to a purchase status of a product or service based on storage contents of storage means for storing information relating to the purchase status of the product or service that is sold by a sales method in which a unit price of the product or service purchased by a plurality of purchasers within a target period is determined based on a total number of purchases of the product or service purchased by the plurality of purchasers within the target period; and transmission means for transmitting link information for access to a communication service device for providing the communication service and information based on the purchase status information to the terminal of the user, in which the link information and the information based on the purchase status information are used by the terminal of the user to request the communication service device for submission screen data being data for displaying a submission screen for submitting the comment and being such data as to automatically input the comment relating to the purchase status of the product or service to a comment input field of the submission screen.

Further, a computer-readable information storage medium according to the present invention is a computer-readable information storage medium having recorded thereon the above-mentioned program.

Further, according to an aspect of the present invention, the comment submission support device may further include comment information generation means for generating comment information indicating the comment relating to the purchase status of the product or service based on the purchase status information, the transmission means may transmit the link information for access to the communication service device for providing the communication service and the comment information to the terminal of the user, and the requesting means may request the communication service device for the submission screen data based on the link information and the comment information.

Further, according to an aspect of the present invention, the transmission means may transmit, to the terminal of the user, product/service screen data being data for displaying a product/service screen on which information relating to the product or service appears and being data including the link information and the comment information, and the terminal of the user may further include: means for causing the display unit to display the product/service screen based on the product/service screen data; and means for requesting the communication service device for the submission screen data based on the link information and the comment information in a case where a predetermined operation is performed on the product/service screen.

Further, according to an aspect of the present invention, the comment submission support device may further include: means for generating product/service screen data for displaying a product/service screen on which information relating to the product or service appears; and means for transmitting the product/service screen data to the terminal of the user, the terminal of the user may further include: means for causing the display unit to display the product/service screen based on the product/service screen data; and means for requesting the comment submission support device for the link information and the comment information in a case where a predetermined operation is performed on the product/service screen, the transmission means may transmit the link information and the comment information to the terminal of the user in a case where a request is received from the terminal of the user, and the terminal of the user may further include means for requesting the communication service device for the submission screen data based on the link information and the comment information in a case where the link information and the comment information are received.

Further, according to an aspect of the present invention, the transmission means may transmit the link information for access to the communication service device for providing the communication service and the purchase status information to the terminal of the user, the terminal of the user may further include comment information generation means for generating comment information indicating the comment relating to the purchase status of the product or service based on the purchase status information, and the requesting means may request the communication service device for the submission screen data based on the link information and the comment information.

Further, according to an aspect of the present invention, the purchase status information acquisition means may acquire, as the purchase status information, information relating to at least one of information relating to the target period and information relating to a number of purchases of the product or service.

Further, according to an aspect of the present invention, the comment submission support system may further include: means for determining whether or not the purchase status of the product or service has become a predetermined status; and means for submitting the comment relating to the purchase status of the product or service in the communication service in a case where it is determined that the purchase status of the product or service has become the predetermined status.

Further, a comment submission support system according to the present invention is a comment submission support system including: a comment submission support device for supporting submission of a comment in a communication service for making public the comment submitted by a contributor to another person; and a terminal of a user which is communicably connected to the comment submission support device, in which: the comment submission support system further includes storage means for storing information relating to a purchase status of a product or service that is sold by a sales method in which a unit price of the product or service purchased by a plurality of purchasers within a target period is determined based on a total number of purchases of the product or service purchased by the plurality of purchasers within the target period; the comment submission support device includes: purchase status information acquisition means for acquiring purchase status information relating to the purchase status of the product or service based on storage contents of the storage means; comment information generation means for generating comment information indicating the comment relating to the purchase status of the product or service based on the purchase status information; and transmission means for transmitting link information for access to a communication service device for providing the communication service and the comment information to the terminal of the user; the terminal of the user includes: means for requesting, based on the link information and the comment information, the communication service device for submission screen data being data for displaying a submission screen for submitting the comment and being such data as to automatically input the comment relating to the purchase status of the product or service to a comment input field of the submission screen; and means for causing a display unit to display the submission screen based on the submission screen data transmitted from the communication service device; and the comment relating to the purchase status of the product or service is automatically input to the comment input field of the submission screen displayed on the display unit.

Further, a comment submission support device according to the present invention is a comment submission support device, which is communicably connected to a terminal of a user, for supporting submission of a comment in a communication service for making public the comment submitted by a contributor to another person, the comment submission support device including: purchase status information acquisition means for acquiring purchase status information relating to a purchase status of a product or service based on storage contents of storage means for storing information relating to the purchase status of the product or service that is sold by a sales method in which a unit price of the product or service purchased by a plurality of purchasers within a target period is determined based on a total number of purchases of the product or service purchased by the plurality of purchasers within the target period; comment information generation means for generating comment information indicating the comment relating to the purchase status of the product or service based on the purchase status information; and transmission means for transmitting link information for access to a communication service device for providing the communication service and the comment information to the terminal of the user, in which the link information and the comment information are used by the terminal of the user to request the communication service device for submission screen data being data for displaying a submission screen for submitting the comment and being such data as to automatically input the comment relating to the purchase status of the product or service to a comment input field of the submission screen.

Further, a method of controlling a comment submission support device according to the present invention is a method of controlling a comment submission support device for supporting submission of a comment in a communication service for making public the comment submitted by a contributor to another person, the method including: a purchase status information acquisition step of acquiring purchase status information relating to a purchase status of a product or service based on storage contents of storage means for storing information relating to the purchase status of the product or service that is sold by a sales method in which a unit price of the product or service purchased by a plurality of purchasers within a target period is determined based on a total number of purchases of the product or service purchased by the plurality of purchasers within the target period; a comment information generation step of generating comment information indicating the comment relating to the purchase status of the product or service based on the purchase status information; and a transmission step of transmitting link information for access to a communication service device for providing the communication service and the comment information to a terminal of the user, in which the link information and the comment information are used by the terminal of the user to request the communication service device for submission screen data being data for displaying a submission screen for submitting the comment and being such data as to automatically input the comment relating to the purchase status of the product or service to a comment input field of the submission screen.

Further, a program according to the present invention is a program for causing a computer communicably connected to a terminal of a user to function as a comment submission support device for supporting submission of a comment in a communication service for making public the comment submitted by a contributor to another person, the program causing the computer to function as: purchase status information acquisition means for acquiring purchase status information relating to a purchase status of a product or service based on storage contents of storage means for storing information relating to the purchase status of the product or service that is sold by a sales method in which a unit price of the product or service purchased by a plurality of purchasers within a target period is determined based on a total number of purchases of the product or service purchased by the plurality of purchasers within the target period; comment information generation means for generating comment information indicating the comment relating to the purchase status of the product or service based on the purchase status information; and transmission means for transmitting link information for access to a communication service device for providing the communication service and the comment information to the terminal of the user, in which the link information and the comment information are used by the terminal of the user to request the communication service device for submission screen data being data for displaying a submission screen for submitting the comment and being such data as to automatically input the comment relating to the purchase status of the product or service to a comment input field of the submission screen.

Further, a computer-readable information storage medium according to the present invention is a computer-readable information storage medium having recorded thereon the above-mentioned program.

Further, a comment submission support system according to the present invention is a comment submission support system including: a comment submission support device for supporting submission of a comment in a communication service for making public the comment submitted by a contributor to another person; and a terminal of a user which is communicably connected to the comment submission support device, in which: the comment submission support system further includes storage means for storing information relating to a purchase status of a product or service that is sold by a sales method in which a unit price of the product or service purchased by a plurality of purchasers within a target period is determined based on a total number of purchases of the product or service purchased by the plurality of purchasers within the target period; the comment submission support device includes: purchase status information acquisition means for acquiring purchase status information relating to the purchase status of the product or service based on storage contents of the storage means; and transmission means for transmitting link information for access to a communication service device for providing the communication service and the purchase status information to the terminal of the user; the terminal of the user includes: comment information generation means for generating comment information indicating the comment relating to the purchase status of the product or service based on the purchase status information; means for requesting, based on the link information and the comment information, the communication service device for submission screen data being data for displaying a submission screen for submitting the comment and being such data as to automatically input the comment relating to the purchase status of the product or service to a comment input field of the submission screen; and means for causing a display unit to display the submission screen based on the submission screen data transmitted from the communication service device; and the comment relating to the purchase status of the product or service is automatically input to the comment input field of the submission screen displayed on the display unit.

Further, a comment submission support device according to the present invention is a comment submission support device, which is communicably connected to a terminal of a user, for supporting submission of a comment in a communication service for making public the comment submitted by a contributor to another person, the comment submission support device including: purchase status information acquisition means for acquiring purchase status information relating to a purchase status of a product or service based on storage contents of storage means for storing information relating to the purchase status of the product or service that is sold by a sales method in which a unit price of the product or service purchased by a plurality of purchasers within a target period is determined based on a total number of purchases of the product or service purchased by the plurality of purchasers within the target period; and transmission means for transmitting link information for access to a communication service device for providing the communication service and the purchase status information to the terminal of the user, in which: the purchase status information is used by the terminal of the user to generate comment information indicating the comment relating to the purchase status of the product or service; and the link information and the comment information are used by the terminal of the user to request the communication service device for submission screen data being data for displaying a submission screen for submitting the comment and being such data as to automatically input the comment relating to the purchase status of the product or service to a comment input field of the submission screen.

Further, a method of controlling a comment submission support device according to the present invention is a method of controlling a comment submission support device for supporting submission of a comment in a communication service for making public the comment submitted by a contributor to another person, the method including: a purchase status information acquisition step of acquiring purchase status information relating to a purchase status of a product or service based on storage contents of storage means for storing information relating to the purchase status of the product or service that is sold by a sales method in which a unit price of the product or service purchased by a plurality of purchasers within a target period is determined based on a total number of purchases of the product or service purchased by the plurality of purchasers within the target period; and a transmission step of transmitting link information for access to a communication service device for providing the communication service and the purchase status information to a terminal of the user, in which: the purchase status information is used by the terminal of the user to generate comment information indicating the comment relating to the purchase status of the product or service; and the link information and the comment information are used by the terminal of the user to request the communication service device for submission screen data being data for displaying a submission screen for submitting the comment and being such data as to automatically input the comment relating to the purchase status of the product or service to a comment input field of the submission screen.

Further, a program according to the present invention is a program for causing a computer communicably connected to a terminal of a user to function as a comment submission support device for supporting submission of a comment in a communication service for making public the comment submitted by a contributor to another person, the program causing the computer to function as: purchase status information acquisition means for acquiring purchase status information relating to a purchase status of a product or service based on storage contents of storage means for storing information relating to the purchase status of the product or service that is sold by a sales method in which a unit price of the product or service purchased by a plurality of purchasers within a target period is determined based on a total number of purchases of the product or service purchased by the plurality of purchasers within the target period; and transmission means for transmitting link information for access to a communication service device for providing the communication service and the purchase status information to the terminal of the user, in which: the purchase status information is used by the terminal of the user to generate comment information indicating the comment relating to the purchase status of the product or service; and the link information and the comment information are used by the terminal of the user to request the communication service device for submission screen data being data for displaying a submission screen for submitting the comment and being such data as to automatically input the comment relating to the purchase status of the product or service to a comment input field of the submission screen.

Further, a computer-readable information storage medium according to the present invention is a computer-readable information storage medium having recorded thereon the above-mentioned program.

Advantageous Effects of Invention

According to the present invention, it is possible to support the submission of such a comment as to enable the person who has viewed the comment to grasp the purchase status of the product or service.

BRIEF DESCRIPTION OF DRAWINGS

[FIG. 2] A diagram illustrating hardware configuration of a server.

[FIG. 3] A diagram illustrating a hardware configuration of a user terminal.

[FIG. 10] A diagram showing an example of a product table.

[FIG. 11] A diagram showing an example of a joint purchase table.

[FIG. 12] A diagram showing an example of a joint purchase price table.

[FIG. 13] A diagram showing an example of a joint purchase status table.

[FIG. 14] A diagram illustrating an example of product screen data.

[FIG. 17] A flowchart illustrating another example of the processing executed in the electronic commerce system.

[FIG. 18] A diagram illustrating another example of the product screen data.

[FIG. 19] A flowchart illustrating another example of the processing executed in the electronic commerce system.

[FIG. 20] A diagram illustrating another example of the product screen data.

[FIG. 21] A diagram illustrating an example of redirection information.

DESCRIPTION OF EMBODIMENT

In the following, exemplary embodiments of the present invention are described in detail with reference to the accompanying drawings. Here, a description is made of a case where the present invention is applied to an electronic commerce system. Specifically, a description is made of an example of a case of realizing a comment submission support system according to the embodiments of the present invention in the electronic commerce system for realizing a virtualized shopping mall in which a plurality of shops are opened.

[First Embodiment]

Figure 1:
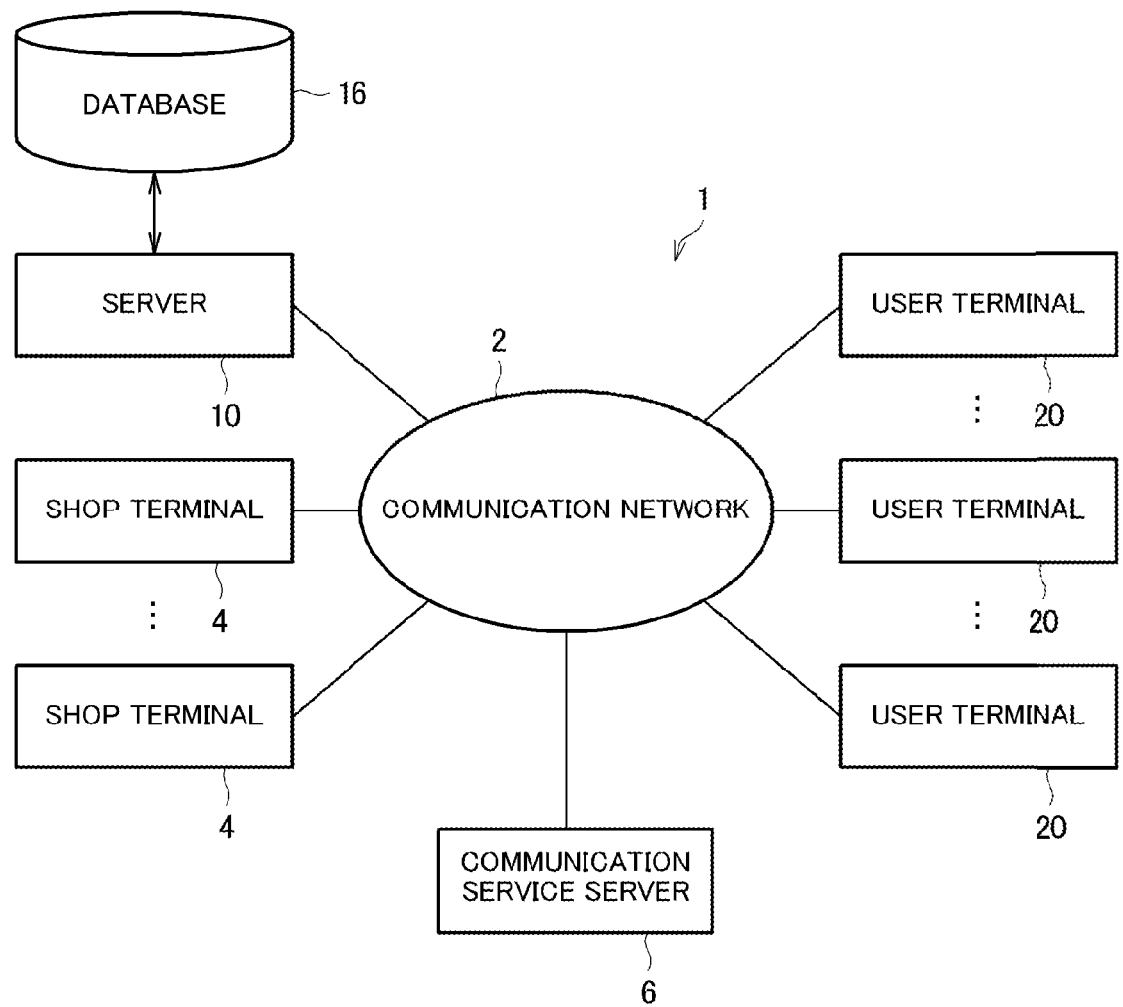
[FIG. 1] A diagram illustrating an overall configuration of an electronic commerce system according to an embodiment of the present invention.

First, a description is made of an electronic commerce system according to a first embodiment of the present invention. FIG. 1 illustrates an overall configuration of the electronic commerce system according to the first embodiment of the present invention. An electronic commerce system 1 illustrated in FIG. 1 is a system for providing the virtualized shopping mall, and includes a server 10 (comment submission support device), a database 16, a plurality of user terminals 20, a plurality of shop terminals 4, and a communication service server 6. The server 10, the plurality of user terminals 20, the plurality of shop terminals 4, and the communication service server 6 are connected to a communication network 2 including, for example, the Internet. The server 10 and the user terminal 20 can mutually perform data communications there between. The communication service server 6 and the user terminal 20 can also mutually perform data communications there between. Further, the server 10 and the shop terminal 4 can also mutually perform data communications there between.

The server 10 is, for example, a virtual shopping mall server that functions as a portal to a virtual shopping mall. The server 10 executes processing based on a processing request received from the user terminal 20 or the shop terminal 4. FIG. 2 illustrates a hardware configuration of the server 10. As illustrated in FIG. 2, the server 10 includes a control unit 11, a main memory unit 12, an auxiliary storage unit 13, an optical disc drive unit 14, and a communication interface 15.

The control unit 11 includes, for example, a central processing unit (CPU), and executes various kinds of processing in accordance with a program. The main memory unit 12 includes, for example, a random access memory (RAM). The main memory unit 12 stores the program and data that are read from the auxiliary storage unit 13 or an optical disc (information storage medium). Further, the main memory unit 12 is also used as a work memory for storing data necessary in the course of processing. The auxiliary storage unit 13 includes, for example, a hard disk drive.

The optical disc drive unit 14 reads the program and the data that are stored in the optical disc. The communication interface 15 is an interface for connecting the server 10 to the communication network 2. The program and the data are supplied to the server 10 through the optical disc. Further, the program and the data are supplied from a remote site to the server 10 through the communication network 2.

The server 10 can access the database 16. The database 16 stores, for example, information on a user who uses the virtual shopping mall, information on products handled in the virtual shopping mall, information on transactions conducted in the virtual shopping mall. Note that, the database 16 may be built in the server 10, or may be built in a server provided separately from the server 10.

The shop terminal 4 is an information processing device provided in a shop opened in the virtual shopping mall. The shop terminal 4 is, for example, a personal computer. The shop terminal 4 is used for registering the information on the products sold in the virtual shopping mall and other such information in the database 16 through the server 10. For example, a dedicated screen provided from the server 10 is displayed on the shop terminal 4. This dedicated screen allows an administrator of the shop to input basic information on the product, information relating to a sales method for the product, and other such information.

The communication service server 6 is a server for providing a communication service for receiving a submitted comment and making the comment public. The communication service server 6 may be a server managed by a corporation that administers the virtual shopping mall, or may be a server managed by a corporation other than the corporation that administers the virtual shopping mall. For example, the communication service server 6 is a server for providing a social networking service such as the Twitter (trademark) service or the Facebook (trademark) service.

In the communication service provided by the communication service server 6, as a rule, a contributor submits a comment without specifying the other party. Then, a person who is to view the comment selects which comment is to be viewed. For example, the user can be involved in communications relating to a field in which he/she is interested by submitting the comment relating to the field and selecting and viewing the comment relating to the field which has been submitted by another user.

The user terminal 20 is an information processing device operated by the user. The user terminal 20 is, for example, a personal computer, a cellular phone terminal, or a portable information terminal (a personal digital assistant: PDA). The user terminal 20 is used for purchasing the product in the virtual shopping mall, for using the communication service provided by the communication service server 6, or for other such purpose. FIG. 3 illustrates a hardware configuration of the user terminal 20. As illustrated in FIG. 3, the user terminal 20 includes a control unit 21, a main memory unit 22, an auxiliary storage unit 23, an optical disc drive unit 24, a communication interface 25, an input unit 26, and a display unit 27.

The control unit 21, the main memory unit 22, the auxiliary storage unit 23, the optical disc drive unit 24, and the communication interface 25 are the same as the control unit 11, the main memory unit 12, the auxiliary storage unit 13, the optical disc drive unit 14, and the communication interface 15 that are illustrated in FIG. 2, respectively. The input unit 26 is used by the user to input various kinds of information, and examples thereof include a keyboard, a mouse, a touch panel, or the like. The display unit 27 is used for displaying various kinds of information, and examples thereof include a liquid crystal display panel or the like.

In the case of this embodiment, for example, a hypertext transfer protocol (HTTP) daemon is activated on the server 10. Further, a browser is activated on the user terminal 20, and the processing request (HTTP request) is transmitted from the user terminal 20 to the server 10 through the browser. Further, a processing result (HTTP response) corresponding to the above-mentioned processing request is transmitted from the server 10 to the user terminal 20. For example, page data described in a web page description language is transmitted to the user terminal 20. Then, based on this page data, a screen based on the processing result is displayed on the display unit 27 of the user terminal 20.

Figure 4:
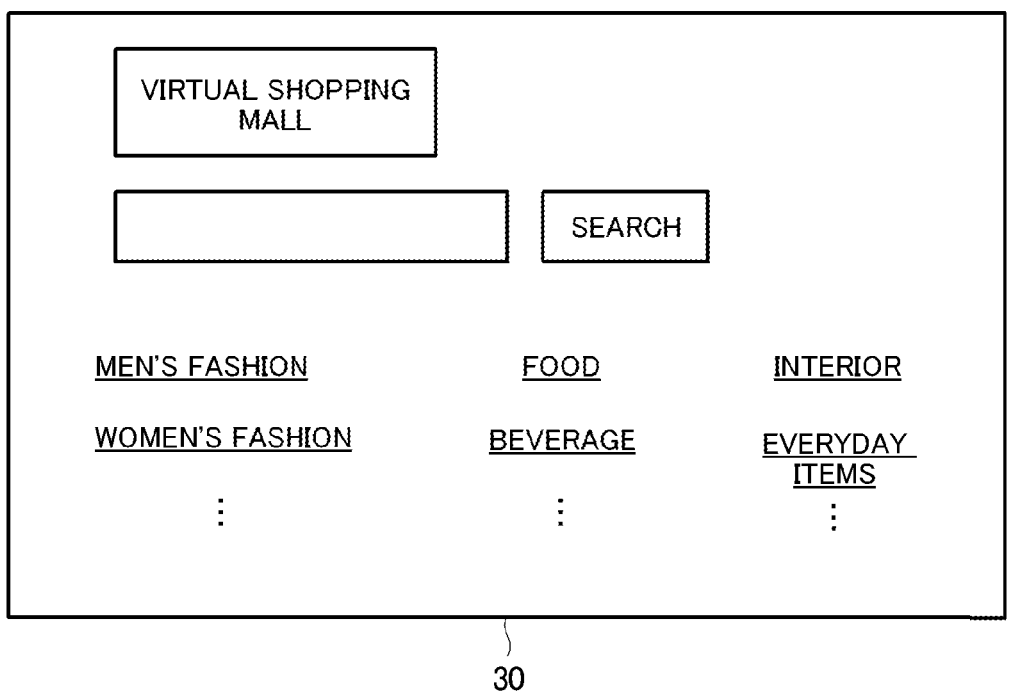
[FIG. 4] A diagram illustrating an example of a top page screen.

The user who uses the virtual shopping mall uses the user terminal 20 to access the server 10. In this case, a top page screen (top page) of the virtual shopping mall is displayed on the user terminal 20. FIG. 4 illustrates an example of the top page screen. A top page screen 30 illustrated in FIG. 4 allows the user to search for the product and select a category of the product.

For example, if the user designates a search condition for the product, the server 10 executes a search for the product, and a product list screen (not shown) for showing a list of products that satisfy the search condition is displayed on the user terminal 20. Further, if the user selects the category of the product, the server 10 acquires a list of products that belong to the category, and a product list screen (not shown) for showing the list is displayed on the user terminal 20.

Figure 5:
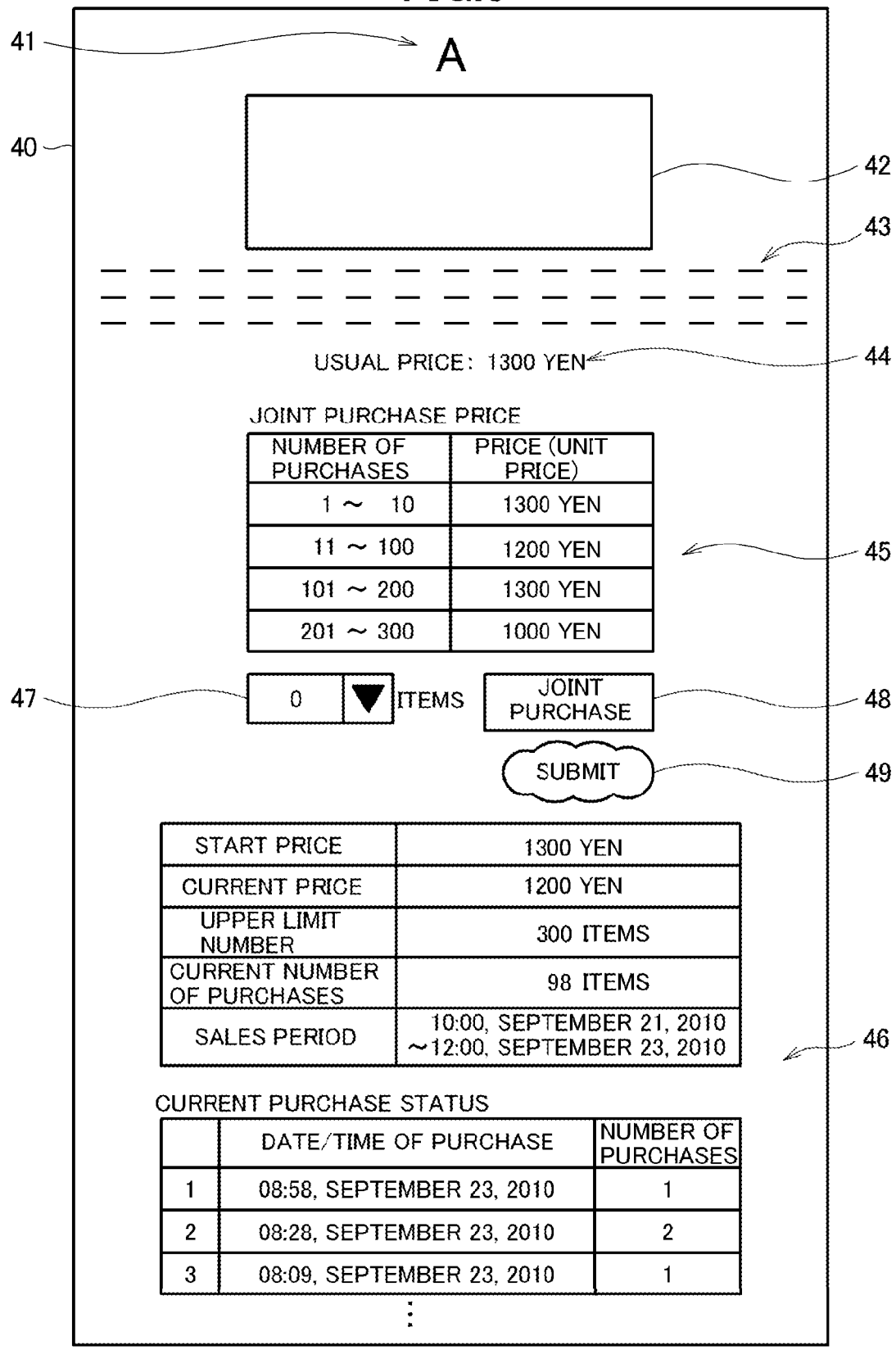
[FIG. 5] A diagram illustrating an example of a product screen.

Then, if the user selects any one of the products on the product list screen, the server 10 acquires information on the product, and a product screen (product page) for purchasing the product is displayed on the display unit 27 of the user terminal 20. FIG. 5 illustrates an example of the product screen. Note that, a product screen 40 illustrated in FIG. 5 is a product screen for the product being a target of a joint purchase (a group buying).

A description is now made of the "joint purchase (group buying)". The electronic commerce system 1 enables the shop to sell products by employing a joint purchase type sales method. For example, in a case of selling a product "A" by the joint purchase type sales method, a sales period for the product "A" is defined, and purchasers of the product "A" are solicited within the sales period. Then, a unit price of the product "A" purchased within the sales period is determined depending on a total number of purchases of the product "A" within the sales period. As the number of purchases of the product "A" becomes larger (in other words, the number of purchasers of the product "A" increases), the unit price of the product "A" becomes lower. The shop can determine whether or not to employ the joint purchase type sales method on a product-to-product basis. Note that, the product may be sold by the joint purchase type sales method according to the user's request.

A name 41, an image 42, descriptions 43, and a usual price 44 of the product are displayed on the product screen 40 illustrated in FIG. 5. Further, information items 45 and 46 unique to the product being the target of the joint purchase are also displayed on the product screen 40. For example, prices for the joint purchase are displayed. Further, the sales period of the product, the price at the start, the current price, an upper limit of the number of the products that can be sold by the shop, and the number of purchases up to the present are also displayed. In addition, purchase statuses up to the present are also displayed.

On the product screen 40 illustrated in FIG. 5, the number of purchases of the product reaches 98 items, and the unit price of the product has become 1,200 yen which is lower than a usual price (1,300 yen) by 100 yen. If the sales period ends while keeping this status, the product is to be sold to each of the purchasers at a unit price of 1,200 yen. Further, if three more items of the product are purchased in this status to cause the number of purchases of the product to reach 101 items, the unit price of the product is to drop to 1,100 yen which is lower than the usual price by 200 yen.

The user who wishes to purchase the product selects the number of purchases in a quantity selection field 47, and clicks on a joint purchase button 48. If the joint purchase button 48 is clicked on, the purchase screen (not shown) for performing a purchase procedure is displayed on the display unit 27 of the user terminal 20. The user performs the purchase procedure on this purchase screen.

In the case of this embodiment, a submission icon 49 for submitting a comment for prompting the joint purchase of the product is displayed on the product screen 40. The submission icon 49 forms a link to the communication service provided by the communication service server 6. If the user clicks on the submission icon 49, a login screen (not shown) for the communication service is displayed. Then, if a login process is normally completed, submission screen data (page data) is transmitted from the communication service server 6 to the user terminal 20, and a submission screen for submitting the comment is displayed on the display unit 27 of the user terminal 20 based on this data. Note that, in a case where a login state is retained in a cookie or the like, the login screen is not displayed, while the submission screen data is transmitted from the communication service server 6 to the user terminal 20, and the submission screen is displayed on the display unit 27 of the user terminal 20.

Figure 6:
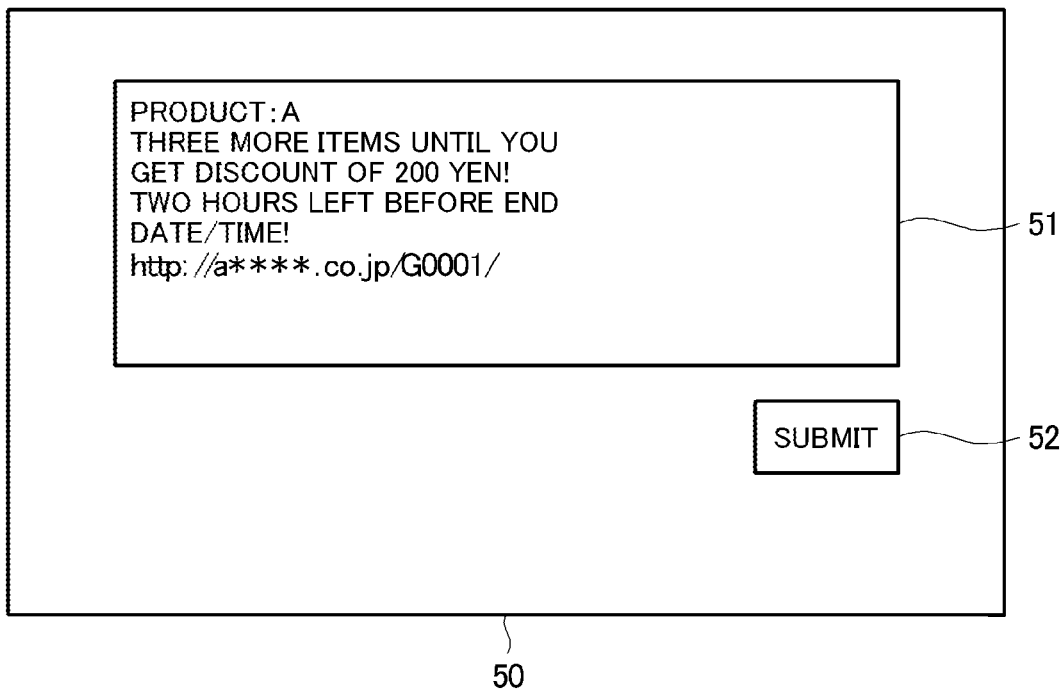
[FIG. 6] A diagram illustrating an example of a submission screen.

FIG. 6 illustrates an example of the submission screen. A submission screen 50 illustrated in FIG. 6 includes an input field 51 that allows the user to input the comment and a submission button 52. Note that, the comment input on this submission screen 50 is not input after specifying the other party who is to view the comment, but is input on the precondition that the comment is to be viewed by an unspecified other party.

In particular, in the case of this embodiment, the comment relating to a joint purchase status of the product is initially displayed in the input field 51. Note that, in FIG. 6, "A" is a product name. "http://a****.co.jp/G0001/" is a uniform resource locator (URL) of product screen data (product page data) on the product "A".

The comment initially displayed in the input field 51 illustrated in FIG. 6 includes the following information.
(1) a product name
(2) the number of purchases necessary for the unit price of the product to drop from the current unit price
(3) a discount (different amount from normal unit price) on the assumption that the unit price of the product has dropped from the current unit price
(4) a remaining time before an end time point of the sales period (period that enables the product to be purchased)
(5) a URL of the product screen data (product page data)

The comment to be initially displayed includes the above-mentioned information, and hence contents of the comment to be initially displayed are contents that allow a person who has viewed this comment to easily grasp the joint purchase status of the product. Further, the contents of the comment to be initially displayed are contents that allow a person who has viewed this comment and has showed interest in the product to easily access the product page.

On the submission screen 50, the user can compose the comment based on the initially-displayed comment. The user adds supplemental descriptions or the like as necessary, and when completing the composition of the comment, clicks on the submission button 52. If the submission button 52 is clicked on, the comment input to the input field 51 is transmitted to the communication service server 6. Then, this comment is made public. Note that, the user can also click on the submission button 52 without adding the supplemental descriptions or the like. In this case, the initially-displayed comment is, without a change, transmitted to the communication service server 6 and made public.

As described above, the electronic commerce system 1 has a comment submission function described above, to thereby enable the user to prompt another user to the joint purchase. Further, the above-mentioned comment submission function includes an input support function, and the comment relating to the joint purchase status of the product is automatically input to the input field 51. According to this input support function, the user can easily submit such a comment as to prompt another user to the joint purchase. Further, even if the automatically-input comment is submitted as it is, another user that has viewed the comment can grasp the joint purchase status of the product. Further, there is an advantage on the shop in that the comment submitted by the user functions as an effective advertisement.

Figures 7, 8, 9:
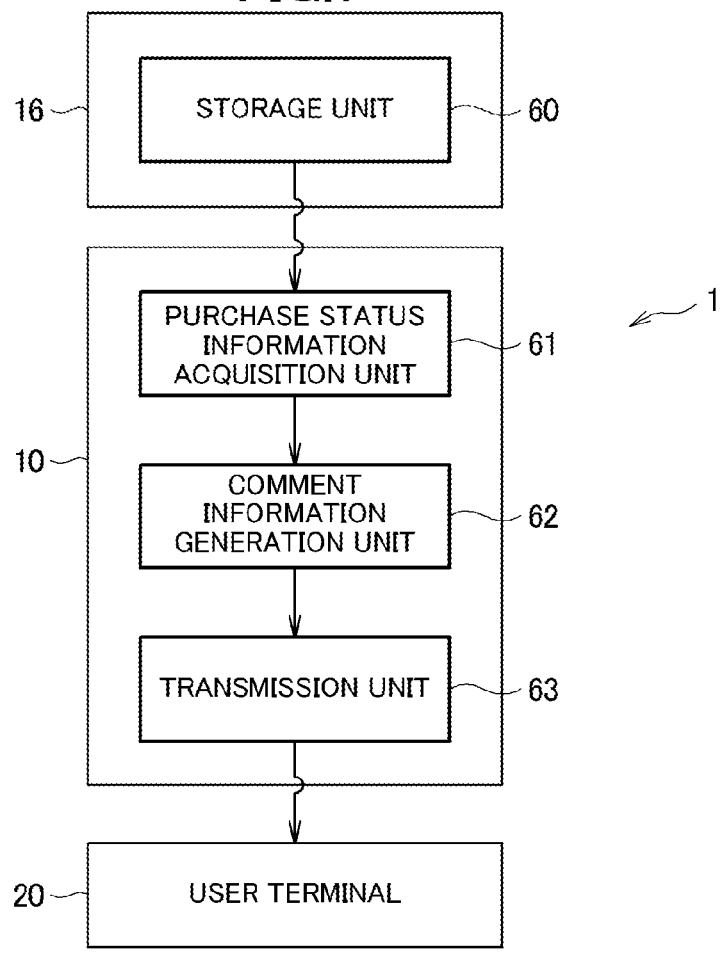
[FIG. 7] A functional block diagram illustrating the electronic commerce system according to the embodiment of the present invention.
[FIG. 8] A diagram showing an example of a user table.
[FIG. 9] A diagram showing an example of a purchase history table.

Next, a description is made of a configuration for realizing the above-mentioned comment submission function (input support function). FIG. 7 is a functional block diagram illustrating functional blocks relating to the above-mentioned comment submission function among functional blocks realized by the electronic commerce system 1. As illustrated in FIG. 7, the electronic commerce system 1 includes a storage unit 60, a purchase status information acquisition unit 61, a comment information generation unit 62, and a transmission unit 63.

For example, the storage unit 60 is realized by the database 16, and the purchase status information acquisition unit 61, the comment information generation unit 62, and the transmission unit 63 are realized by the server 10. When the control unit 11 of the server 10 executes the program, the control unit 11 functions as the purchase status information acquisition unit 61, the comment information generation unit 62, and the transmission unit 63.

First, a description is made of the storage unit 60. The storage unit 60 stores various kinds of data. For example, the storage unit 60 stores data for displaying the top page screen 30 and the product screen 40 on the user terminal 20. FIG. 8 to FIG. 13 show examples of the data stored in the storage unit 60.

FIG. 8 shows an example of a user table. The information on the user who uses the virtual shopping mall is registered in the user table. The user table shown in FIG. 8 includes "user ID", "full name", "address", "e-mail address", and "credit card information" fields.

FIG. 9 shows an example of a purchase history table. A product purchase history of each user is registered in the purchase history table. The purchase history table shown in FIG. 9 includes "transaction ID", "user ID", "product ID", "date/time of purchase", "number of purchases", and "amount" fields.

FIG. 10 shows an example of a product table. The information on the products handled in the virtual shopping mall is registered in the product table. The product table shown in FIG. 10 includes "product ID", "shop ID", "product name", "category", "image", "URL", "descriptions", "unit price", "inventory quantity", and "joint purchase flag" fields. The "shop ID" field indicates a shop ID of the shop handling the product. Further, the "image" field indicates a file name, a saved location, or the like of image data on the product. The "URL" field indicates the URL of the product screen data (product page data). In addition, the "unit price" field indicates the usual price of the product.

The "joint purchase flag" field indicates whether or not to employ the joint purchase type sales method. For example, the "joint purchase flag" field stores "0" or "1". "0" indicates not to employ the joint purchase type sales method, and "1" indicates to employ the joint purchase type sales method.

Note that, the product whose product ID is "G0001" is assumed to be the product "A" that appears on the product screen 40 illustrated in FIG. 5.

The data shown in FIG. 11 to FIG. 13 is data in which information necessary in a case of employing the joint purchase type sales method is registered. FIG. 11 shows an example of a joint purchase table. The joint purchase table shown in FIG. 11 includes "product ID", "sales period", and "upper limit number" fields. The "upper limit number" field indicates a maximum number of items that can be sold at the shop by the joint purchase type sales method.

FIG. 12 shows an example of a joint purchase price table. Information relating to the price in the case of employing the joint purchase type sales method is registered in the joint purchase price table. The joint purchase price table shown in FIG. 12 includes "product ID", "number of purchases", and "unit price" fields, and indicates a relationship between the number of purchases of the product and the unit price of the product. As the number of purchases of the product becomes larger, the unit price of the product becomes lower.

FIG. 13 shows an example of a joint purchase status table. The purchase status up to the current time point of the product being the target of the joint purchase is registered in the joint purchase status table. The joint purchase status table shown in FIG. 13 includes "product ID", "user ID", "date/time of purchase", and "number of purchases" fields.

The data shown in FIG. 8 to FIG. 13 is referred to in a case of executing a search for the product or generating the product list screen or the product screen 40. For example, the product screen 40 is generated based on the product table, the joint purchase table, the joint purchase price table, and the joint purchase status table.

Next, a description is made of the purchase status information acquisition unit 61. The purchase status information acquisition unit 61 acquires purchase status information. The purchase status information is information relating to the joint purchase status of the product. The purchase status information is information necessary to generate the comment to be automatically input to the input field 51 of the submission screen 50, and includes, for example, the following information.
(1) information relating to the number of items purchased so far within the sales period
(2) information relating to the unit price
(3) information relating to the end time point of the sales period (period that enables the product to be purchased)

The purchase status information is acquired based on the joint purchase table (FIG. 11), the joint purchase price table (FIG. 12), and the joint purchase status table (FIG. 13).

Next, descriptions are made of the comment information generation unit 62 and the transmission unit 63. Based on the purchase status information acquired by the purchase status information acquisition unit 61, the comment information generation unit 62 generates comment information. The comment information is information indicating the comment relating to the joint purchase status of the product. The transmission unit 63 transmits, to the user terminal 20, link information for access to the communication service server 6 and information based on the purchase status information acquired by the purchase status information acquisition unit 61. In the case of this embodiment, the comment information generated by the comment information generation unit 62 corresponds to the "information based on the purchase status information", and the transmission unit 63 transmits the link information and the comment information to the user terminal 20 in association with each other.

Note that, the link information and the comment information (information based on purchase status information) are used by the user terminal 20 to request the communication service server 6 for "submission screen data being data for displaying the submission screen 50 and being such data as to automatically input the comment relating to the joint purchase status of the product to the input field 51 of the submission screen 50".

In the case of this embodiment, the transmission unit 63 transmits, to the user terminal 20, the product screen data (product page data) for displaying the product screen 40 on the user terminal 20. This product screen data includes the above-mentioned link information and comment information.

FIG. 14 illustrating an example of the product screen data. FIG. 14 illustrates a source of the product screen data. Further, the product screen data illustrated in FIG. 14 corresponds to the product screen 40 illustrated in FIG. 5. However, FIG. 14 illustrates only a part of the product screen data. As described above, when a predetermined operation (clicking operation of the submission icon 49) is performed on the product screen 40, the user terminal 20 requests the communication service server 6 for the submission screen data. FIG. 14 illustrates only a part relating to the submission icon 49.

Note that, in FIG. 14, "http://b**.com/home?status= . . . " is the URL of the submission screen data provided by the communication service server 6. Further, "http://a.co.jp/G0001/" is the URL of the product screen data on the product "A". In addition, "http://c**.com/icon.gif" is the URL of the image data of the submission icon 49. Further, [line break] indicates that a line break code is inserted.

In the product screen data illustrated in FIG. 14, the URL of the submission screen data is associated with the submission icon 49. Further, the URL of the submission screen data includes a status argument. The status argument plays a role in transmitting the character string that is to be initially displayed in the input field 51 of the submission screen 50 to the communication service server 6.

For this reason, the character string that is to be initially displayed in the input field 51 is set as the status argument. In the case of this embodiment, the character string representing the comment relating to the joint purchase status of the product is set as the status argument. In the example illustrated in FIG. 14, the character string representing the comment initially displayed in the input field 51 of the submission screen 50 illustrated in FIG. 6 is set as the status argument.

Note that, URL-encoded character string is set as the status argument, but in FIG. 14, for the sake of convenience, the character string that has not been URL-encoded is set as the status argument as it is.

If the submission icon 49 of the product screen 40 is clicked on, based on the URL associated with the submission icon 49, the user terminal 20 requests the communication service server 6 for the submission screen data. In this case, the character string set as the status argument is also transmitted to the communication service server 6.

The communication service server 6 generates such submission screen data as to initially display in the input field 51 the character string set as the status argument. Then, this submission screen data is transmitted to the user terminal 20, and the submission screen 50 is displayed on the user terminal 20. The character string set as the status argument is initially displayed in the input field 51 in this case.

Note that, in the case of the product screen data illustrated in FIG. 14, the URL of the submission screen data corresponds to the above-mentioned "link information", and the character string set as the status argument (character string representing the comment relating to the joint purchase status of the product) corresponds to the above-mentioned "comment information".

Figure 15:
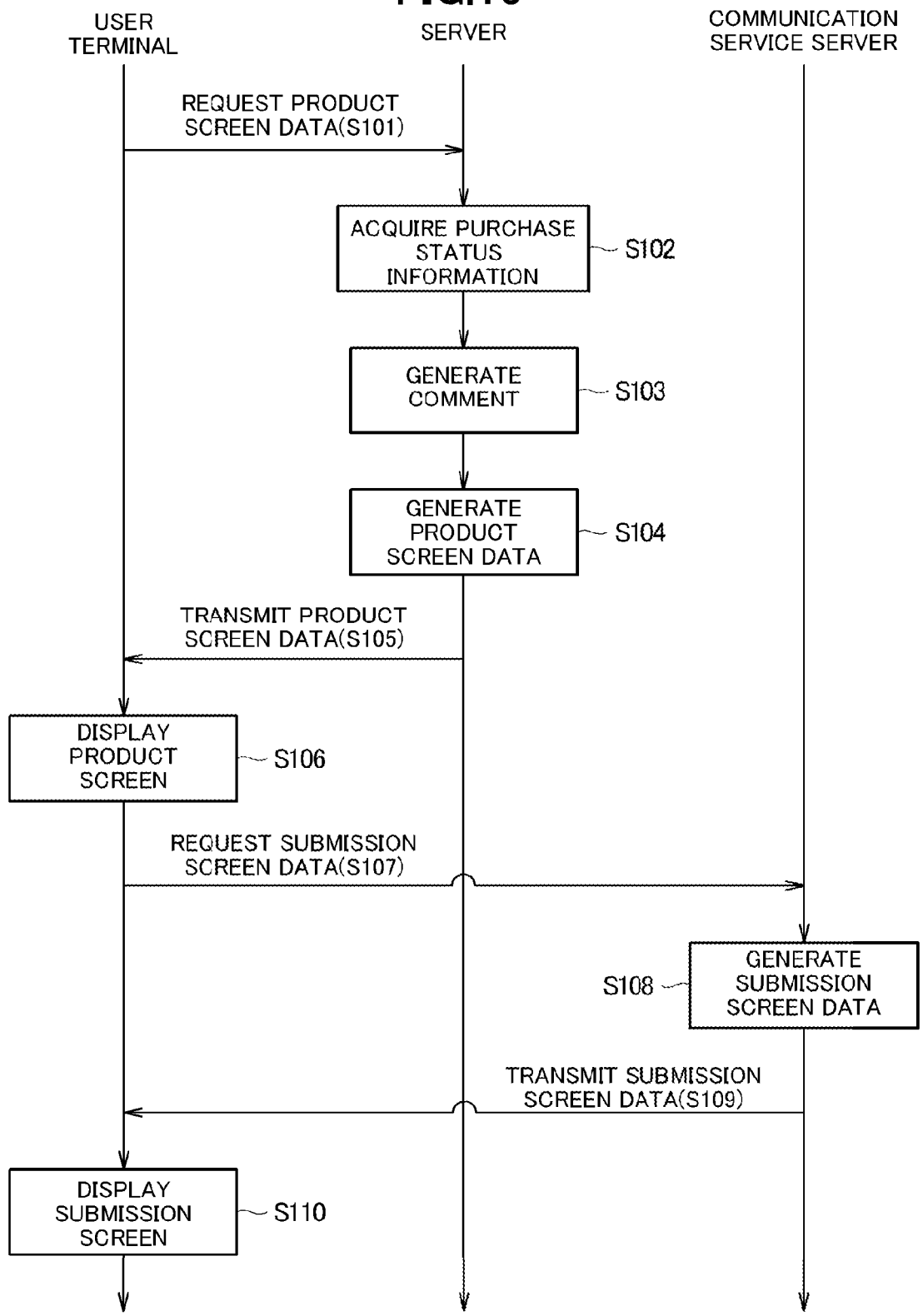
[FIG. 15] A flowchart illustrating an example of processing executed in the electronic commerce system.

Next, a description is made of processing executed in the electronic commerce system 1 in order to realize the functional blocks described above. FIG. 15 is a flowchart illustrating an example of processing executed after any one of the products is selected on the product list screen displayed on the user terminal 20 before the submission screen 50 is displayed on the user terminal 20. Note that, the product selected on the product list screen is hereinafter referred to as "target product".

As illustrated in FIG. 15, the control unit 21 of the user terminal 20 requests the server 10 for the product screen data on the target product (S101). In this case, the product ID of the target product is transmitted from the user terminal 20 to the server 10.

The control unit 11 of the server 10, which has been received the above-mentioned request, executes processing for transmitting the product screen data on the target product to the user terminal 20. Note that, in the following, a description is made of processing executed in a case where the target product is set as the target of the joint purchase.

First, the control unit 11 (purchase status information acquisition unit 61) acquires the purchase status information on the target product (S102). For example, the control unit 11 acquires the following information based on the joint purchase table (FIG. 11), the joint purchase price table (FIG. 12), and the joint purchase status table (FIG. 13).
(1) the number of purchases necessary for the unit price of the target product to drop from the current unit price
(2) the discount (different amount from normal unit price) on the assumption that the unit price of the target product has dropped from the current unit price
(3) the remaining time before the end time point of the sales period of the target product Note that, in addition to the above-mentioned information, the control unit 11 acquires the name of the target product and the URL of the product screen data on the target product. Those pieces of information are acquired from the product table (FIG. 10).

After the purchase status information on the target product is acquired, the control unit 11 (comment information generation unit 62) generates the comment relating to the joint purchase status of the target product (S103). In other words, the control unit 11 generates the comment that is to be initially displayed in the input field 51 of the submission screen 50. For example, such a comment as to be initially displayed in the input field 51 of the submission screen 50 illustrated in FIG. 6 is generated based on the purchase status information acquired in Step S102.

Then, the control unit 11 generates the product screen data on the target product (S104). For example, the product screen data as illustrated in FIG. 14 is generated. Note that, in this case, the character string representing the comment generated in Step S103 is set as the status argument included in the URL of the submission screen data.

After the product screen data on the target product is generated, the control unit 11 (transmission unit 63) transmits the product screen data to the user terminal 20 (S105). Then, the user terminal 20 causes the display unit 27 to display the product screen 40 of the target product based on the received product screen data (S106).

Then, when the submission icon 49 of the product screen 40 is clicked on, the control unit 21 (requesting means) of the user terminal 20 requests the communication service server 6 for the submission screen data (S107). In this case, as described above, the character string set as the status argument is transmitted from the user terminal 20 to the communication service server 6. In other words, the character string representing the comment generated in Step S103 is transmitted to the communication service server 6 as the status argument.

The communication service server 6, which has received the above-mentioned request, generates the submission screen data (S108). In this case, the communication service server 6 generates such submission screen data as to initially display in the input field 51 the character string set as the status argument. The submission screen data generated in this manner is transmitted to the user terminal 20 (S109).

The control unit 21 of the user terminal 20 causes the display unit 27 to display the submission screen 50 based on the received submission screen data (S110). In this case, the comment generated in Step S103 is initially displayed in the input field 51. After the above-mentioned steps, the processing illustrated in FIG. 15 is brought to an end.

[Second Embodiment]

A description is made of an electronic commerce system according to a second embodiment of the present invention. An overall configuration of an electronic commerce system 1 according to the second embodiment is the same as in the first embodiment. Further, the electronic commerce system 1 according to the second embodiment also provides the same virtual shopping mall as in the first embodiment.

In the electronic commerce system 1 according to the first embodiment, the comment initially displayed in the input field 51 is generated on the server 10 (see Step S103 of FIG. 15), but the electronic commerce system 1 according to the second embodiment is different from the electronic commerce system 1 according to the first embodiment in that the comment is generated on the user terminal 20.

Figure 16:
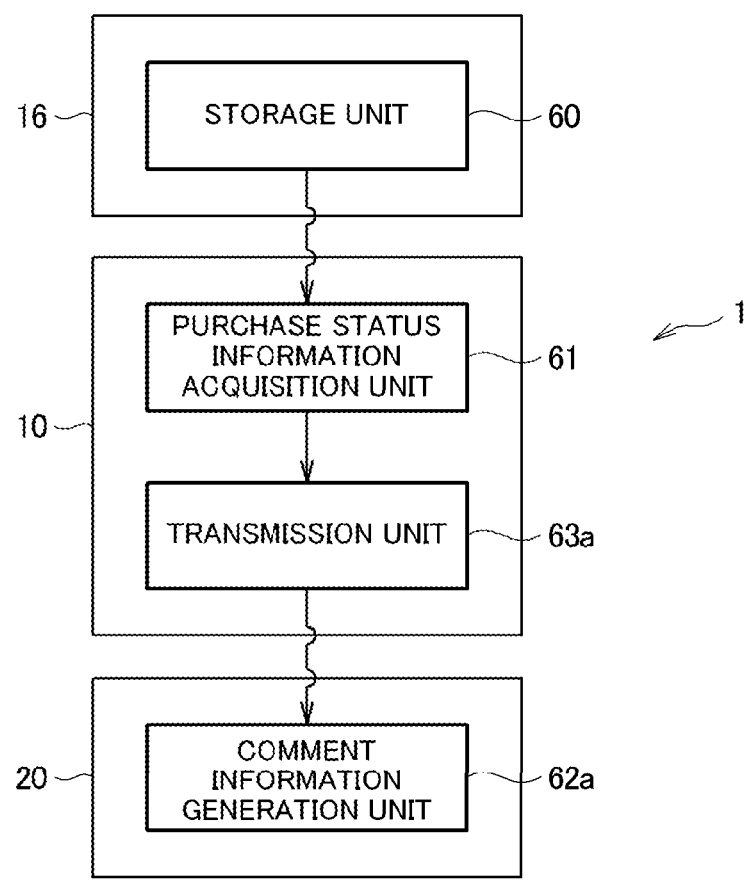
[FIG. 16] A functional block diagram of an electronic commerce system according to an embodiment of the present invention.

FIG. 16 is a functional block diagram illustrating functional blocks relating to the above-mentioned comment submission function among functional blocks realized by the electronic commerce system 1 according to the second embodiment. The electronic commerce system 1 according to the second embodiment is different from the electronic commerce system 1 according to the first embodiment (FIG. 7) in that the server 10 does not include the comment information generation unit 62 and the user terminal 20 includes a comment information generation unit 62a. Further, in the electronic commerce system 1 according to the second embodiment, a transmission unit 63a included in the server 10 has a different function from the transmission unit 63 of the first embodiment. Note that, the storage unit 60 and the purchase status information acquisition unit 61 are the same as in the first embodiment. For this reason, the descriptions of the storage unit 60 and the purchase status information acquisition unit 61 are omitted, and descriptions are now made of the transmission unit 63a and the comment information generation unit 62a.

The transmission unit 63a transmits, to the user terminal 20, the link information for access to the communication service server 6 and the information based on purchase status information acquired by the purchase status information acquisition unit 61. In the case of this embodiment, the transmission unit 63a transmits the purchase status information itself as the "information based on purchase status information". The transmission unit 63a transmits the link information and the purchase status information to the user terminal 20 in association with each other. As described later, the purchase status information is used by the user terminal 20 to generate the comment information indicating the comment relating to the joint purchase status of the product.

The comment information generation unit 62a generates the comment information indicating the comment relating to the joint purchase status of the product based on the purchase status information transmitted by the transmission unit 63a. The comment information generated by the comment information generation unit 62a is the same as the comment information generated by the comment information generation unit 62 of the first embodiment. In the same manner as in the first embodiment, the link information and the comment information are used by the user terminal 20 to request the communication service server 6 for the "submission screen data being data for displaying the submission screen 50 and being such data as to automatically input the comment relating to the joint purchase status of the product to the input field 51 of the submission screen 50".

FIG. 17 is a flowchart illustrating an example of processing executed in the electronic commerce system 1 in order to realize the functional blocks illustrated in FIG. 16. In the same manner as in FIG. 15, FIG. 17 illustrates the processing executed after any one of the products is selected on the product list screen displayed on the user terminal 20 before the submission screen 50 is displayed on the user terminal 20. Instead of the processing illustrated in FIG. 15, for example, the processing illustrated in FIG. 17 is executed, to thereby realize the functional blocks illustrated in FIG. 16.

Also in the processing illustrated in FIG. 17, the control unit 21 of the user terminal 20 requests the server 10 for the product screen data on the target product (S201). Then, the control unit 11 (purchase status information acquisition unit 61) of the server 10 acquires the purchase status information on the target product (S202). The processing of those steps is the same as the processing of Step S101 and Step S102 of FIG. 15.

After the purchase status information on the target product is acquired, the control unit 11 generates the product screen data on the target product (S203). The product screen data includes the purchase status information acquired in Step S202.

FIG. 18 illustrates an example of the product screen data generated in Step S203. In the same manner as in FIG. 14, FIG. 18 also illustrates a source of the product screen data. Further, in the same manner as in the product screen data illustrated in FIG. 14, the product screen data illustrated in FIG. 18 also corresponds to the product screen 40 illustrated in FIG. 5. However, FIG. 18 also illustrates only a part of the product screen data. As described above, when a predetermined operation (clicking operation on the submission icon 49) is performed on the product screen 40, the user terminal 20 requests the communication service server 6 for the submission screen data. FIG. 18 illustrates only a part relating to the submission icon 49.

The purchase status information acquired in Step S202 is embedded in the product screen data generated in Step S203. In the example illustrated in FIG. 18, a form group 70 set to be hidden is provided, and the purchase status information acquired in Step S202 is retained in the form group 70.

Specifically, in the example illustrated in FIG. 18, a product name "A" is retained in the first form of the form group 70. The number "3" of purchases necessary for the unit price of the target product to drop from the current unit price is retained in the second form. A discount "200" on the assumption that the unit price of the target product has dropped from the current unit price is retained in the third form. A remaining time "2" before the end time point of the sales period of the target product is retained in the fourth form. A URL "http://a****.co.jp/G0001/" of the product screen data on the target product is retained in the fifth form.

As described later, the information retained in the form group 70 is used as a basis in the case of generating the comment to be initially displayed in the input field 51.

Further, the product screen data generated in Step S203 includes programs 71 and 72 for executing Steps S206 and S207 described later. Those programs are described in a programming language such as JavaScript (trademark) or the like. In addition, the product screen data is set so that the programs (Steps S206 and S207) are executed when the submission icon 49 is clicked on.

In the example illustrated in FIG. 18, a func function is executed when the submission icon 49 is clicked on (see reference numeral 73). Further, the URL of the submission screen data is retained in the func function. The func function is defined to request the communication service server 6 for the submission screen data after a make_comment function is executed (see reference numeral 72).

Note that, although details are omitted in FIG. 18 (see reference numeral 71), the make_comment function is a function of generating the character string representing the comment that is to be initially displayed in the input field 51 based on the information retained in the form group 70 and outputting the generated character string. The details of the processing of the make_comment function are the same as in Step S103 of FIG. 15.

The func function is defined to transmit the character string output from the make_comment function to the communication service server 6 as the status argument in the case of requesting the communication service server 6 for the submission screen data (see reference numeral 72).

Note that, in the case of the product screen data illustrated in FIG. 18, the URL of the submission screen data retained as a part of the func function corresponds to the above-mentioned "link information". Further, the information retained in the form group 70 corresponds to the above-mentioned "purchase status information". Further, in the case of the product screen data illustrated in FIG. 18, the information (purchase status information) that is retained in the form group 70 and the URL of the submission screen data (link information) are associated with each other through the func function and the make_comment function, with the result that the character string representing the comment (comment relating to the joint purchase status of the product) generated based on the information retained in the form group 70 is set as the status argument included in the URL of the submission screen data.

After the product screen data as described above is generated, the control unit 11 (transmission unit 63a) transmits the product screen data on the target product to the user terminal 20 (S204). Then, the control unit 21 of the user terminal 20 causes the display unit 27 to display the product screen 40 of the target product based on the received product screen data (S205).

Then, when the submission icon 49 of the product screen 40 is clicked on, the control unit 21 of the user terminal 20 (comment information generation unit 62a) generates the comment relating to the joint purchase status of the target product (S206). As described above, when the submission icon 49 is clicked on, the above-mentioned func function is executed on the user terminal 20. Then, the above-mentioned make_comment function is executed during the execution of the func function, to thereby execute the processing of Step S206.

After the comment relating to the joint purchase status of the target product is generated, the control unit 21 of the user terminal 20 (requesting means) requests the communication service server 6 for the submission screen data (S207). As described above, the processing of Step S207 is executed by the func function executed when the submission icon 49 is clicked on. Note that, in this case, the control unit 21 of the user terminal 20 requests the communication service server 6 for the submission screen data, and transmits the character string representing the comment generated in Step S206 to the communication service server 6 as the status argument.

The communication service server 6, which has received the above-mentioned request, generates the submission screen data (S208), and transmits the generated submission screen data to the user terminal 20 (S209). The processing of those steps is the same as the processing of Step S108 and Step S109 of FIG. 15.

The control unit 21 of the user terminal 20 receives the submission screen data and causes the display unit 27 to display the submission screen 50 based on the received submission screen data (S210). In this case, the comment generated in Step S206 is initially displayed in the input field 51. After the above-mentioned steps, the processing illustrated in FIG. 17 is brought to an end.

[Third Embodiment]

A description is made of an electronic commerce system according to a third embodiment of the present invention. An overall configuration of an electronic commerce system 1 according to the third embodiment is the same as in the first embodiment. Further, the electronic commerce system 1 according to the third embodiment also provides the same virtual shopping mall as in the first embodiment.

In the electronic commerce system 1 according to the first or second embodiment, the information (comment information or purchase status information) for initially displaying the comment in the input field 51 is included in the product screen data (see FIGS. 14 and 18), but the electronic commerce system 1 according to the third embodiment is different from the electronic commerce system 1 according to the first and second embodiments in that the comment information and the purchase status information are not included in the product screen data.

A functional block diagram of the electronic commerce system 1 according to the third embodiment is the same as in the first embodiment (FIG. 7). However, in the electronic commerce system 1 according to the third embodiment, the processing executed in order to realize the functional blocks illustrated in FIG. 7 is different from the processing in the first embodiment. FIG. 19 is a flowchart illustrating an example of processing executed in the electronic commerce system 1 according to the third embodiment. In the same manner as in FIG. 15, FIG. 19 also illustrates processing executed after any one of the products is selected on the product list screen displayed on the user terminal 20 before the submission screen 50 is displayed on the user terminal 20.

Also in the processing illustrated in FIG. 19, the control unit 21 of the user terminal 20 requests the server 10 for the product screen data on the target product (S301). This processing is the same as the processing of Step S101 of FIG. 15.

The control unit 11 of the server 10, which has received the request from the user terminal 20, generates data on the product page of the target product (S302).

FIG. 20 illustrates an example of the product screen data generated in Step S302. In the same manner as in FIG. 14, FIG. 20 also illustrates a source of the product screen data. Further, in the same manner as in the product screen data illustrated in in FIG. 14 and FIG. 18, the product screen data illustrated in FIG. 20 also corresponds to the product screen 40 illustrated in FIG. 5. However, FIG. 20 also illustrates only a part of the product screen data. FIG. 20 illustrates only a part relating to the submission icon 49.

In the product screen data generated in Step S303, the URL of the submission screen data is not associated with the submission icon 49. Instead thereof, the URL of the program for transmitting redirection information to the submission screen data to the user terminal 20 is associated with the submission icon 49. In the case of the product screen data illustrated in FIG. 20, "http://a****.co.jp/redirect.cgi?id=G0001" indicates the URL of the above-mentioned program.

After the product screen data on the target product is generated, the control unit 11 transmits the product screen data to the user terminal 20 (S303). The control unit 21 of the user terminal 20 causes the display unit 27 to display the product screen 40 of the target product based on the received product screen data (S304).

Then, when a predetermined operation (clicking operation on the submission icon 49) is performed on the product screen 40, the control unit 21 of the user terminal 20 requests the server 10 for the redirection information to the submission screen data (S305). In this case, the product ID of the target product is also transmitted from the user terminal 20 to the server 10.

The control unit 11 (purchase status information acquisition unit 61) of the server 10, which has received the above-mentioned request, acquires the purchase status information on the target product (S306). Then, the control unit 11 (comment information generation unit 62) generates the comment relating to the joint purchase status of the target product (S307). The processing of those steps is the same as the processing of Steps S103 and S104 of FIG. 15.

After the comment relating to the joint purchase status of the target product is generated, the control unit 11 generates the redirection information to the submission screen data (S308).

FIG. 21 illustrates an example of the above-mentioned redirection information. As illustrated in FIG. 21, the redirection information includes the URL of the submission screen data. In this case, the URL of the submission screen data is the same as the URL associated with the submission icon 49 of the product screen data illustrated in FIG. 14. The URL of the submission screen data includes the status argument, and the character string representing the comment generated in Step S307 is set as the status argument.

Note that, in the case of the processing illustrated in FIG. 19, the URL of the submission screen data included in the redirection information illustrated in FIG. 21 corresponds to the above-mentioned "link information". Further, the character string set as the status argument (character string representing the comment relating to the joint purchase status of the target product) corresponds to the above-mentioned "comment information".

The control unit 11 (transmission unit 63) transmits the redirection information generated in Step S308 to the user terminal 20 (S309). Then, the user terminal 20, which has received the redirection information, executes a redirection to the submission screen data based on the redirection information, and requests the communication service server 6 for the submission screen data (S310). In this case, the character string representing the comment generated in Step S307 is transmitted to the communication service server 6 as the status argument.

Note that, in Step S310, the redirection to the submission screen data may be automatically performed, or may be performed according to the user's operation.

The communication service server 6, which has received the above-mentioned request, generates the submission screen data (S311), and transmits the submission screen data to the user terminal 20 (S312). The processing of those steps is the same as the processing of Steps S108 and S109 of FIG. 15.

The control unit 21 of the user terminal 20 receives the submission screen data, and causes the display unit 27 to display the submission screen 50 based on the submission screen data (S313). In this case, the comment generated in Step S307 is initially displayed in the input field 51. After the above-mentioned steps, the processing illustrated in FIG. 19 is brought to an end.

Note that, in the electronic commerce system 1 according to the third embodiment (in other words, processing illustrated in FIG. 19) described above, the comment relating to the joint purchase status of the target product is generated on the server 10, but the comment may be generated on the user terminal 20 in the same manner as in the second embodiment (in other words, processing illustrated in FIG. 17). In this case, the redirection information transmitted to the user terminal 20 in Step S309 may include the purchase status information acquired in Step S306 and the program for generating the comment. Further, it suffices that the redirection to the submission screen data (Step S310) maybe executed after the comment is generated between Step S309 and Step S310.

Incidentally, in the case of the electronic commerce system 1 according to the first or second embodiment (in other words, processing illustrated in FIG. 15 and FIG. 17), the purchase status information on the target product is acquired before the product screen 40 is displayed. For this reason, for example, in a case where a period after the product screen 40 is displayed before the submission icon 49 is clicked on is long, the purchase status of the target product may change during the period. Then, as a result, a difference may occur between the joint purchase status indicated by the comment initially displayed in the input field 51 and an actual joint purchase status. In this respect, according to the electronic commerce system 1 according to the third embodiment (in other words, processing illustrated in FIG. 19), the comment on which a most recent joint purchase status has been reflected is initially displayed in the input field 51.

On the other hand, according to the electronic commerce system 1 according to the first or second embodiment (in other words, processing illustrated in FIG. 15 and FIG. 17), the number of times of communications between the server 10 and the user terminal 20 becomes smaller than the processing illustrated in FIG. 19, which can reduce load imposed on the communication network 2.

[Conclusion]

In the electronic commerce system 1 according to the first to third embodiments described above, the above-mentioned comment submission function can be realized by the server 10 (comment submission support device). According to this comment submission function, the user becomes able to prompt another user to the joint purchase.

In particular, the above-mentioned comment submission function includes the input support function, and the comment relating to the joint purchase status of the product is automatically input to the input field 51. According to this input support function, the user can easily submit such a comment as to prompt another user to the joint purchase. Further, even if the automatically-input comment is submitted as it is, another user that has viewed the comment can grasp the joint purchase status of the product. Further, from the viewpoint of the shop, there is an advantage that the comment submitted by the user functions as an effective advertisement.

[Modified Example]

Note that, the present invention is not limited to the embodiments described above.

(A) For example, another object such as a button or a text maybe displayed on the product screen 40 instead of the submission icon 49 (image).

(B) Further, for example, the server 10 may submit the comment relating to the joint purchase status of the product in the communication service. A description is now made of this mode.

Figure 22:
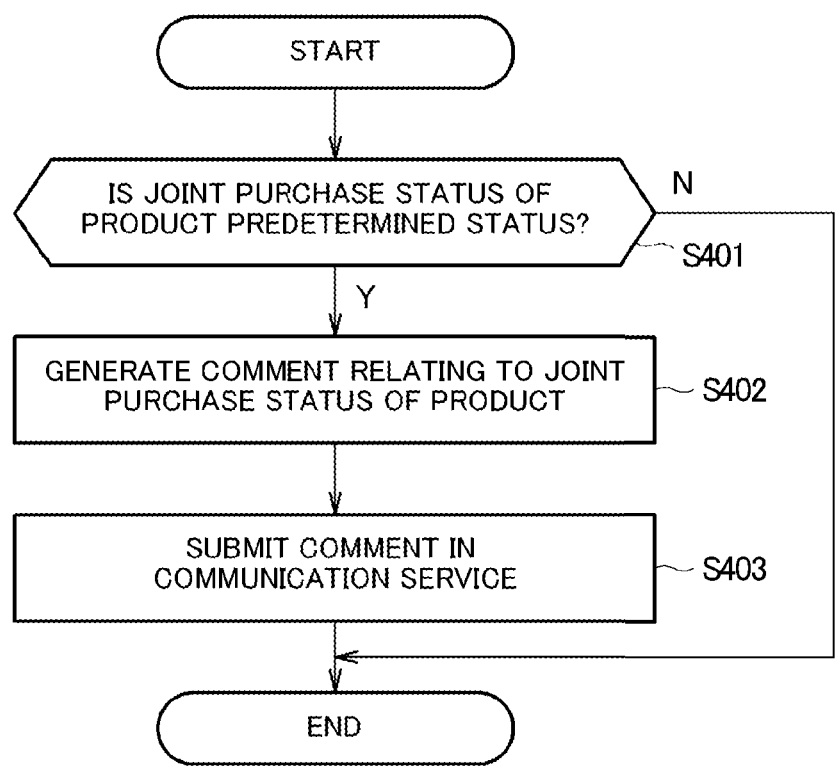
[FIG. 22] A flowchart illustrating an example of the processing executed in the electronic commerce system.

FIG. 22 is a flowchart illustrating an example of processing executed by the server 10 to submit the comment relating to the joint purchase status of the product in the communication service. The control unit 11 of the server 10 executes the processing illustrated in FIG. 22 in accordance with the program. This program is realized by a program called, for example, "Bot".

Note that, the processing illustrated in FIG. 22 is executed for each product being the target of the joint purchase. Further, the processing illustrated in FIG. 22 is executed at a predetermined time point. For example, the processing illustrated in FIG. 22 is executed every predetermined time period (for example, every hour). Alternatively, the processing illustrated in FIG. 22 is executed when a predetermined time instant is reached.

As illustrated in FIG. 22, the control unit 11 determines whether or not the joint purchase status of the product is a predetermined status (S401). "The case where the joint purchase status of the product is the predetermined status" represents, for example, a case where the remaining time before the end time point of the sales period is equal to or shorter than a reference time (for example, three hours) with the unit price of the product being higher than a minimum price.

Alternatively, "the case where the joint purchase status of the product is the predetermined status" may represent, for example, a case where the remaining time before the end time point of the sales period is equal to or shorter than the reference time (for example, three hours) with the number of purchases of the product being less than a reference number. In this case, the "reference number" may be set as, for example, a lower limit of the number of purchases that causes the unit price of the product to be a minimum price. For example, in a case where the unit price of the product is set as shown in FIG. 12, "201" may be used as the reference number.

If it is determined that the joint purchase status of the product is the predetermined status, the control unit 11 generates the comment relating to the joint purchase status of the product (S402). This processing may be the same as the processing of Steps S102 and S103 of FIG. 15.

Then, the control unit 11 submits the comment generated in Step S402 in the communication service (S403). The control unit 11 logs in to the communication service with an account of the virtual shopping mall, and submits the comment generated in Step S402. On the other hand, if it is determined in Step S401 that the joint purchase status of the product is not the predetermined status, this processing is brought to an end without executing the processing of Steps S402 and S403.

In the above-mentioned manner, the comment relating to the product can be submitted depending on the joint purchase status of the product. For example, when the product is not selling well and the number of purchases of the product is small, the comment is submitted to prompt the joint purchase of the product. On the other hand, when the product is selling well and the number of purchases of the product is large (in other words, the remaining number of products is small), the comment is not submitted. If the comment is submitted even in such a case, for example, an inconvenience situation in which "the user who has viewed the comment cannot purchase the product due to being sold out even if he/she shows interest in the product" may occur, but such an inconvenience situation can be avoided in the above-mentioned manner. In other words, it is possible to effectively submit such a comment as to prompt the joint purchase of the product.

(C) In the electronic commerce system 1, not only goods such as clothing, food, or the like but also data such as electronic book data, music data, or video data may be sold as the products.

Further, in the electronic commerce system 1, not only the product but also a service may be sold in the same manner as in the product. For example, a coupon for receiving the service at a restaurant, a hotel, or the like may be sold in the electronic commerce system 1. Further, the service (coupon) may be sold by the joint purchase type sales method. In addition, in the same manner as in the product, such a comment submission support as to prompt the joint purchase of the service or other such support may be performed.

The invention claimed is:

1. A comment submission support system, comprising:
a comment submission support device for supporting submission of a comment in a communication service for making public the comment submitted by a contributor to another person; and
a terminal of a user which is communicably connected to the comment submission support device, wherein:
the comment submission support system further comprises a storage for storing information relating to a purchase status of a product or service that is sold by a sales method in which a unit price of the product or service purchased by a plurality of purchasers within a target period is determined based on a total number of purchases of the product or service purchased by the plurality of purchasers within the target period;
the comment submission support device comprises:
at least one first memory operable to store first program code;
at least one first processor operable to read the first program code and operate as instructed by the first program code, the first program code including:
purchase status information acquisitions code that causes the at least one first processor to acquire purchase status information relating to the purchase status of the product or service based on storage contents of the storage;
comment information generation code that causes the least one first processor to generate comment information indicating a comment comprising an indication of the purchase status of the product or service based on the purchase status information; and
transmission code that causes the at least one first processor to transmit product/service screen data comprising link information for access to a communication service device for providing the communication service and the comment information to the terminal of the user;
the terminal of the user comprises:
at least one second memory operable to store second program code;
at least one second processor operable to read the second program code and operate as instructed by the second program code, the second program code including:
product/service screen generation code that causes the at least one second processor to generate a product/service screen to be displayed on a display based on the product/service screen data transmitted from the comment submission support device, the product/service screen generation code configured to cause the at least one second processor to generate an item associated with the link information on the product/service screen:
requesting code that causes the at least one second processor to in response to a user operation related to the item on the product/service screen, transmit the comment information to the communication service device by using the link information to thereby request the communication service device to transmit submission screen data based on the comment information, the submission screen data being data for displaying a submission screen for submitting the comment and being such data as to automatically display a default comment comprising an indication of the purchase status of the product or service on a comment input field of the submission screen; and
submission screen generation code that causes the at least one second processor to generate the submission screen to be displayed on the display based on the submission screen data transmitted from the communication service device; and
the default comment comprising an indication of the purchase status of the product or service is automatically displayed on the comment input field of the submission screen displayed on the display in a way that allows the user to edit the default comment comprising an indication of the purchase status of the product or service.

2. A comment submission support system, comprising:
a comment submission support device for supporting submission of a comment in a communication service for making public the comment submitted by a contributor to another person; and
a terminal of a user which is communicably connected to the comment submission support device, wherein:
the comment submission support system further comprises a storage for storing information relating to a purchase status of a product or service that is sold by a sales method in which a unit price of the product or service purchased by a plurality of purchasers within a target period is determined based on a total number of purchases of the product or service purchased by the plurality of purchasers within the target period;
the comment submission support device further comprises:
at least one first memory operable to store first program code;
at least one first processor operable to read the first program code and operate as instructed by the first program code, the first program code including:
first transmission code that causes the at least one first processor to transmit product/service screen data to the terminal of the user;
the terminal of the user further comprises:
at least one second memory operable to store second program code;
at least one second processor operable to read the second program code and operate as instructed by the second program code, the second program code including:
product/service screen generation code that causes the at least one second processor to generate a product/service screen to be displayed on a display based on the product/service screen data transmitted from the comment submission support device; and
first requesting code that causes the at least one second processor to, in response to a user operation related to an item on the product/service screen, request the comment submission support device to transmit link information and comment information, the link information being information for access to a communication service device for providing the communication service, and the comment information indicating a comment comprising an indication of the purchase status of the product or service;
the first program further includes:
purchase status information acquisition code that causes the at least one first processor to acquire purchase status information relating to the purchase status of the product or service based on storage contents of the storage;
comment information generation code that causes the at least one first processor to generate the comment information based on the purchase status information; and
second transmission code that causes the at least one first processor to transmit the link information and the comment information to the terminal of the user the second program code further includes:
second requesting code that causes the at least one second processor to, when the link information and the comment information are received, transmit the comment information to the communication service device by using the link information to thereby request the communication service device to submit submission screen data based on the comment information the submission screen data being data for displaying a submission screen for submitting the comment and being such data as to automatically display a default comment comprising an indication of the purchase status of the product or service on a comment input field of the submission screen; and
submission screen generation code that causes the at least one second processor to generate the submission screen to be displayed on the display based on the submission screen data transmitted from the communication service device; and
the default comment comprising an indication of the purchase status of the product or service is automatically displayed on the comment input field of the submission screen displayed on the display in a way that allows the user to edit the default comment comprising an indication of the purchase status of the product or service.

3. A comment submission support system, comprising:
a comment submission support device for supporting submission of a comment in a communication service for making public the comment submitted by a contributor to another person; and
a terminal of a user which is communicably connected to the comment submission support device, wherein:
the comment submission support system further comprises a storage for storing information relating to a purchase status of a product or service that is sold by a sales method in which a unit price of the product or service purchased by a plurality of purchasers within a target period is determined based on a total number of purchases of the product or service purchased by the plurality of purchasers within the target period;
the comment submission support device comprises:
at least one first memory operable to store first program code;
at least one first processor operable to read the first program code and operate as instructed by the first program code, the first program code including:
purchase status information acquisition code that causes the at least one first processor to acquire purchase status information relating to the purchase status of the product or service based on storage contents of the storage;
transmission code that causes the at least one first processor to transmit product/service screen data comprising link information for access to a communication service device for providing the communication service and the purchase status information to the terminal of the user;
the terminal of the user comprises:
at least one second memory operable to store second program code;
at least one second processor operable to read the second program code and operate as instructed by the second program code, the second program code including:
product/service screen generation code that causes the at least one second processor to generate a product/service screen to be displayed on a display based on the product/service screen data transmitted from the comment submission support device, the product/service screen generation code configured to cause the at least one second processor to generate an item associated with the link information on the product/service screen;
comment information generation code that causes the at least one second processor to generate comment information indicating a comment comprising an indication of the purchase status of the product or service based on the purchase status information;
requesting code that causes the at least one second processor to, in response to the user operation related to the item on the product/service, transmit the comment information to the communication service device by using the link information to thereby request the communication service device to transmit submission screen data based on the comment information, the submission screen data being data for displaying a submission screen for submitting the comment and being such data as to automatically display a default comment comprising an indication of the purchase status of the product or service on a comment input field of the submission screen; and
submission screen generation code that causes the at least one second processor to generate the submission screen to be displayed on the display based on the submission screen data transmitted from the communication service device; and
the default comment comprising an indication of the purchase status of the product or service is automatically displayed on the comment input field of the submission screen displayed on the display in a way that allows the user to edit the default comment comprising an indication of the purchase status of the product or service.

4. The comment submission support system according to claim 1, wherein the purchase status information acquisition code causes the at least one first processor to acquire, as the purchase status information, information relating to at least one of information relating to the target period and information relating to a number of purchases of the product or service.

5. The comment submission support system according to claim 1, wherein the first program code further includes:
code that causes the at least one first processor to determine whether or not the purchase status of the product or service has become a predetermined status; and
code that causes the at least one first processor to submit comment comprising an indication of the purchase status of the product or service in the communication service in a case where it is determined that the purchase status of the product or service has become the predetermined status.

6. A method of controlling a comment submission support device for supporting submission of a comment in a communication service for making public the comment submitted by a contributor to another person, the method comprising:
a purchase status information acquisition step of acquiring purchase status information relating to a purchase status of a product or service based on storage contents of storage for storing information relating to the purchase status of the product or service that is sold by a sales method in which a unit price of the product or service purchased by a plurality of purchasers within a target period is determined based on a total number of purchases of the product or service purchased by the plurality of purchasers within the target period;

a comment information generation step of generating comment information indicating a comment comprising an indication of the purchase status of the product or service based on the purchase status information; and a transmission step of transmitting product/service screen data comprising link information for access to a communication service device for providing the communication service and the comment information to a terminal of a user, wherein the link information and the comment information are used by the terminal of the user to generate a product/service screen to be displayed on a display based on the product/service screen data transmitted from the comment submission support device by generating an item associated with the link information on the product/service screen, and, in response to a user operation related to the item on the product/service screen, transmit the comment information to the communication service device by using the link information to thereby request the communication service device for submission screen data being data for displaying a submission screen for submitting the comment based on the comment information, the submission screen data being such data as to automatically display a default comment comprising an indication of the purchase status of the product or service on a comment input field of the submission screen in a way that allows the user to edit the default comment comprising an indication of the purchase status of the product or service.

7. A method of controlling a comment submission support device for supporting submission of a comment in a communication service for making public the comment submitted by a contributor to another person, the method comprising:

a purchase status information acquisition step of acquiring purchase status information relating to a purchase status of a product or service based on storage contents of a storage for storing information relating to the purchase status of the product or service that is sold by a sales method in which a unit price of the product or service purchased by a plurality of purchasers within a target period is determined based on a total number of purchases of the product or service purchased by the plurality of purchasers within the target period; and a transmission step of transmitting product/service screen data comprising link information for access to a communication service device for providing the communication service and the purchase status information to a terminal of a user, wherein the purchase status information is used by the terminal of the user to generate comment information indicating a comment comprising an indication of the purchase status of the product or service; and the link information and the comment information are used by the terminal of the user to generate a product/service screen to be displayed on a display based on the product/service screen data transmitted from the comment submission support device by generating an item associated with the link information on the product/service screen, and, in response to a user operation related to the item on the product/service screen, and transmit the comment information to the communication service device by using the link information to thereby request the communication service device for submission screen data being data for displaying a submission screen for submitting the comment based on the comment information, the submission screen data being such data as to automatically display a default comment comprising an indication of the purchase status of the product or service on a comment input field of the submission screen in a way that allows the user to edit the default comment comprising an indication of the purchase status of the product or service.

8. The comment submission support system according to claim 1, wherein:

the purchase status information acquisition code causes the at least one first processor to acquire the purchase status information relating to the purchase status of the product or service including at least a current number of purchases of the product or service, and the comment information generation code causes the at least one first processor to generate the comment information indicating the comment comprising an indication of the purchase status of the product or service including at least a remaining number of purchases required for the unit price of the product or service to drop from a current unit price, the remaining number of purchases being updated each time the current number of purchases is changed.

9. The comment submission support system according to claim 3, wherein:

the purchase status information acquisition code causes the at least one first processor to acquire the purchase status information relating to the purchase status of the product or service including at least a current number of purchases of the product or service, and the comment information generation code causes the at least one second processor to generate the comment information indicating the comment comprising an indication of the purchase status of the product or service including at least a remaining number of purchases required for the unit price of the product or service to drop from a current unit price, the remaining number of purchases being updated each time the current number of purchases is changed.

10. The comment submission support system according to claim 1, wherein the purchase status in the default comment includes joint purchase status that indicates discount availability for the product or the service for a group purchase of the product or the service.

11. A comment submission support system, comprising:

a comment submission support device for supporting submission of a comment in a communication service for making public the comment submitted by a contributor to another person; and a terminal of a user which is communicably connected to the comment submission support device, wherein:

the comment submission support system further comprises a storage for storing information relating to a purchase status of a product or service that is sold by a sales method in which a unit price of the product or service purchased by a plurality of purchasers within a target period is determined based on a total number of purchases of the product or service purchased by the plurality of purchasers within the target period;

the comment submission support device further comprises:
at least one first memory operable to store first program code;
at least one first processor operable to read the first program code and operate as instructed by the first program code, the first program code including:
first transmission code that causes the at least one first processor to transmit product/service screen data to the terminal of the user;

the terminal of the user further comprises:
at least one second memory operable to store second program code;
at least one second processor operable to read the second program code and operate as instructed by the second program code, the second program code including:
product/service screen generation code that causes the at least one second processor to generate a product/service screen to be displayed on a display based on the product/service screen data transmitted from the comment submission support device; and
first requesting code that causes the at least one second processor to, in response to a user operation related to an item on the product/service screen, request the comment submission support device to transmit link information and comment information, the link information being information for access to a communication service device for providing the communication service, and the comment information indicating a comment comprising an indication of the purchase status of the product or service;
the first program code further includes:
purchase status information acquisition code that causes the at least one first processor to acquire purchase status information relating to the purchase status of the product or service based on storage contents of the storage;
comment information generation code that causes the at least one first processor to generate the comment information based on the purchase status information; and
second transmission code that causes the at least one first processor to transmit the link information and the comment information to the terminal of the user;
the second program code further includes:
second requesting code that causes the at least one second processor to, when the link information and the comment information are received, transmit the comment information to the communication service device by using the link information to thereby request the communication service device to transmit submission screen data based on the comment information, the submission screen data being data for displaying a submission screen for submitting the comment and being such data as to automatically display a default comment comprising an indication of the purchase status of the product or service on a comment input field of the submission screen; and
submission screen generation code that causes the at least one second processor to generate the submission screen to be displayed on the display based on the submission screen data transmitted from the communication service device; and
the default comment comprising an indication of the purchase status of the product or service is automatically displayed on the comment input field of the submission screen displayed on the display in a way that allows the user to edit the default comment comprising an indication of the purchase status of the product or service.

12. A method of controlling a comment submission support device for supporting submission of a comment in a communication service for making public the comment submitted by a contributor to another person, the method comprising:
a first transmission step of transmitting product/service screen data to a terminal of a user, the product/service screen data being used by the terminal of the user to generate a product/service screen to be displayed on a display;
a purchase status information acquisition step of acquiring purchase status information relating to a purchase status of a product or service based on storage contents of a storage for storing information relating to the purchase status of the product or service that is sold by a sales method in which a unit price of the product or service purchased by a plurality of purchasers within a target period is determined based on a total number of purchases of the product or service purchased by the plurality of purchasers within the target period;
a comment information generation step of generating comment information indicating a comment comprising an indication of the purchase status of the product or service based on the purchase status information; and
a second transmission step of transmitting link information for access to a communication service device for providing the communication service and the comment information to the terminal of the user,
wherein the link information and the comment information are used by the terminal of the user to transmit the comment information to the communication service device by using the link information to thereby request the communication service device for submission screen data based on the comment information, the submission screen data being data for displaying a submission screen for submitting the comment and being such data as to automatically display a default comment comprising an indication of the purchase status of the product or service on a comment input field of the submission screen in a way that allows the user to edit the default comment comprising an indication of the purchase status of the product or service.

13. A method of controlling a comment submission support device for supporting submission of a comment in a communication service for making public the comment submitted by a contributor to another person, the method comprising:
a first transmission step of transmitting product/service screen data to a terminal of a user, the product/service screen data being used by the terminal of the user to generate a product/service screen to be displayed on a display;
a purchase status information acquisition step of acquiring purchase status information relating to a purchase status of a product or service based on storage contents of a storage for storing information relating to the purchase status of the product or service that is sold by a sales method in which a unit price of the product or service purchased by a plurality of purchasers within a target period is determined based on a total number of purchases of the product or service purchased by the plurality of purchasers within the target period; and
a second transmission step of transmitting link information for access to a communication service device for providing the communication service and the purchase status information to the terminal of the user,
wherein the purchase status information is used by the terminal of the user to generate comment information indicating a comment comprising an indication of the purchase status of the product or service; and
the link information and the comment information are used by the terminal of the user to transmit the comment information to the communication service device by using the link information to thereby request the communication service device for submission screen data based on the comment information, the submission screen data being data for displaying a submission screen for submitting the comment and being such data as to automatically display a default comment comprising an indication of the purchase status of the product or service on a comment input field of the submission screen in a way that allows the user to edit the default comment comprising an indication of the purchase status of the product or service.

* * * * *